US012745214B2

(12) United States Patent
Luo et al.

(10) Patent No.: US 12,745,214 B2
(45) Date of Patent: Sep. 22, 2026

(54) WIRELESS COMMUNICATION METHOD AND DEVICE

(71) Applicant: GUANGDONG OPPO MOBILE TELECOMMUNICATIONS CORP., LTD., Dongguan (CN)

(72) Inventors: Chaoming Luo, Dongguan (CN); Lei Huang, Singapore (SG); Huijuan Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 281 days.

(21) Appl. No.: 18/584,901

(22) Filed: Feb. 22, 2024

(65) Prior Publication Data

US 2024/0205878 A1 Jun. 20, 2024

Related U.S. Application Data

(63) Continuation of application No. PCT/CN2021/114115, filed on Aug. 23, 2021.

(51) Int. Cl.

| | |
|---|---|
| ***H04W 64/00*** | (2009.01) |
| ***H04L 5/00*** | (2006.01) |
| ***H04W 76/11*** | (2018.01) |
| ***H04W 84/12*** | (2009.01) |

(52) U.S. Cl.
CPC ......... *H04W 64/006* (2013.01); *H04L 5/0048* (2013.01); *H04W 76/11* (2018.02); *H04W 84/12* (2013.01)

(58) Field of Classification Search
CPC ... H04W 64/006; H04W 76/11; H04W 84/12; H04W 8/005; H04W 48/16; H04W 24/08; H04W 24/10; H04W 4/30; H04W 4/38; H04L 5/0048
See application file for complete search history.

(56) References Cited

U.S. PATENT DOCUMENTS

2015/0098358 A1* 4/2015 Park .................... H04W 48/10 370/254
2021/0007016 A1 1/2021 Xin
(Continued)

FOREIGN PATENT DOCUMENTS

AU 2004301610 C1 5/2008
CN 112689300 A 4/2021
(Continued)

OTHER PUBLICATIONS

Supplementary European Search Report issued on Sep. 19, 2024 for the corresponding European Patent Application No. 21954451.7.
(Continued)

*Primary Examiner* — Mohamed A Kamara
(74) *Attorney, Agent, or Firm* — Ladas & Parry, LLP

(57) ABSTRACT

A wireless communication method and device are provided. The method comprises that: a sensing session initiation device executes a target sensing session establishment process according to the type of a target sensing session to be established, and/or the sensing session initiation device or a sensing session response device executes a target sensing end-of-session process according to the type of a target sensing session to be ended.

20 Claims, 16 Drawing Sheets

(56) References Cited

U.S. PATENT DOCUMENTS

| | | | | |
|---|---|---|---|---|
| 2023/0254053 | A1* | 8/2023 | Kim | H04B 17/24 370/252 |
| 2023/0319877 | A1* | 10/2023 | Chitrakar | H04W 74/0808 370/329 |
| 2024/0073797 | A1* | 2/2024 | Omer | H04W 24/08 |

FOREIGN PATENT DOCUMENTS

| | | | | |
|---|---|---|---|---|
| CN | 112738758 A | | 4/2021 | |
| CN | 112825568 A | | 5/2021 | |
| CN | 112738758 B | | 7/2021 | |
| CN | 115243306 A | * | 10/2022 | H04B 17/30 |
| WO | 2021001746 A1 | | 1/2021 | |
| WO | 2023023899 A1 | | 3/2023 | |

OTHER PUBLICATIONS

Han Tony Xiao: "TGbf Motions List"; IEEE 802.11-20/1874R38. IEEE-SA Mentor, Piscataway, NJ Usaieee-SA Mentor, Piscataway, NJ USA, Feb. 5, 2021, pp. 1-89, XP093080451.

First Office Action of the corresponding Chinese patent application No. 202180099985.6, issued on Jan. 25, 2025.

International Search Report in the international application No. PCT/CN2021/114115, mailed on May 19, 2022, 5 pages with English translation.

Written Opinion of the International Search Authority in the international application No. PCT/CN2021/114115, mailed on May 19, 2022, 9 pages with English translation.

Part 11: Wireless LAN Medium Access Control (MAC) and Physical Layer (PHY) Specifications Amendment 8: Enhancements for extremely high throughput (EHT), IEEE P802.11be™/D1.0 Draft Standard for Information technology-Telecommunications and information exchange between systems Local and metropolitan area networks- Specific requirements, Prepared by the 802.11 Working Group of the LAN/MAN Standards Committee of the IEEE Computer Society, IEEE P802.11be/D1.0, May 2021, pp. 1-635, 635 pages.

Part 11: Wireless LAN Medium Access Control (MAC) and Physical Layer (PHY) Specifications, IEEE Std 802.11 ™-2020 (Revision of IEEE Std 802.Nov. 2016), Developed by the LAN/MAN Standards Committee, pp. 1-2499, 2499 pages.

Part 11: Wireless LAN Medium Access Control (MAC) and Physical Layer (PHY) Specifications Amendment1: Enhancements for High Efficiency WLAN, IEEE Std 802.11ax™-2021 (Amendment to IEEE Std 802. Nov. 2020), Developed by the LAN/MAN Standards Committee, pp. 1-767, 767 pages.

Part 11: Wireless LAN Medium Access Control 11 (MAC) and Physical Layer (PHY) Specifications Amendment 4: Enhancements for positioning, Prepared by 802.11 Working Group of LAN/WAN Standard Committee of the IEEE, IEEE P802.11az™/D3.2 Jul. 2021, pp. 1-278, 278 pages.

Cheng Chen, Intel, "Overview of WLAN sensing protocol", doc.: IEEE 802.11-20/1232r0, Date: Aug. 16, 2020, the whole document, 11 pages.

Insun Jang, LG Electronics, "Discussion on WLAN Sensing Procedure", doc.: IEEE 802.11-20/1804r1, Date: Oct. 9, 2020, the whole document, 13 pages.

Cheng Chen, Intel, "Wi-Fi Sensing Definitions", doc.: IEEE 802.11-20/1849r4, Date: Nov. 15, 2020, the whole document, 15 pages.

Rui Du, et al. (Huawei), "Definitions and scenarios of the WLAN sensing-follow ups", doc.: IEEE 802.11-21/0147r3, Date: Jan. 26, 2021, the whole document, 21 pages.

Cheng Chen, Intel, "Overview of Wi-Fi sensing protocol", doc.: IEEE 802.11-20/1851r3, Date: Nov. 12, 2020, the whole document, 12 pages.

Solomon Trainin, Qualcomm, "Sensing session and measurement exchange identification", doc.: IEEE 802.11-21/0644r3, Date: May 10, 2021, the whole document, 14 pages.

Cheng Chen, Intel, "Discussions on sensing measurement flows", doc.: IEEE 802.11-21/0990r2, Date: Jun. 16, 2021, the whole document, 15 pages.

John Doe, Some Company, "Specification Framework for TGbf", doc.: IEEE 802.11-21/0504r2, Date: Jul. 20, 2021, the whole document, 7 pages.

Solomon Trainin, Qualcomm, "Analysis of SENS approaches", doc.: IEEE 802.11-20/1960r1, Date: Jan. 7, 2021, the whole document, 16 pages.

Solomon Trainin, Qualcomm, "Sensing session and measurement exchange identification", doc.: IEEE 802.11-21/0644r4, Date: Jun. 28, 2021, the whole document, 14 pages.

Cheng Chen, Intel, "Comparison of FTM and sensing procedure", doc.: IEEE 802.11-21/0369r0, Date: Mar. 4, 2021, the whole document, 13 pages.

Cheng Chen, Intel, "Considerations of sensing negotiation", doc.: IEEE 802.11-21/0370r1, Date: Mar. 5, 2021, the whole document, 10 pages.

Part 11: Wireless LAN Medium Access Control (MAC) and Physical Layer (PHY) Specifications, IEEE Std 802.11™ 2020 (Revision of IEEE Std 802.11, 2016), Developed by the LAN/MAN Standards Committee, pp. 2500-4378, 1879 pages.

* cited by examiner

Figure 3:
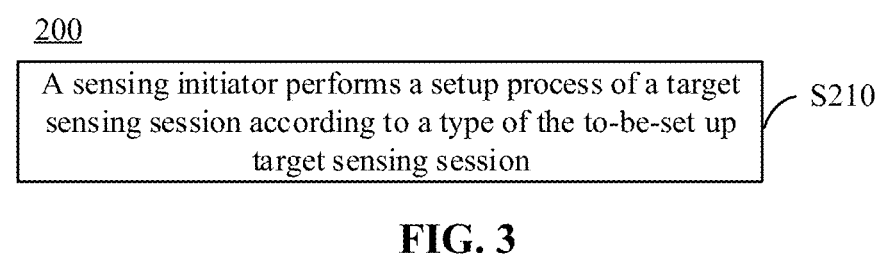

200

A sensing initiator performs a setup process of a target sensing session according to a type of the to-be-set up target sensing session

Figure 9:
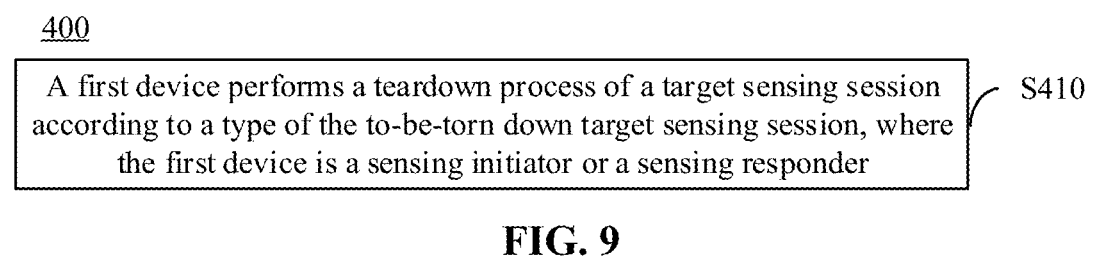

A first device performs a teardown process of a target sensing session according to a type of the to-be-torn down target sensing session, where the first device is a sensing initiator or a sensing responder

WIRELESS COMMUNICATION METHOD AND DEVICE

CROSS-REFERENCE TO RELATED APPLICATION

This is a continuation application of International Patent Application No. PCT/CN2021/114115, filed on Aug. 23, 2021, entitled "WIRELESS COMMUNICATION METHOD AND DEVICE", the disclosure of which is hereby incorporated by reference in its entirety.

BACKGROUND

Wireless Local Area Network (WLAN) sensing is a function enhancement of 802.11 protocol proposed by 802.11 bf standard. WLAN sensing measures and senses a surrounding environment through wireless signals. In this way, it can complete many functions such as detection of whether someone invades, moves, falls, etc., in an indoor environment, or accomplish gesture recognition, spatial three-dimensional image construction, or multiple other functions. How to achieve a setup of a sensing session and a teardown of the sensing session is an urgent problem to be solved.

SUMMARY

Embodiments of the present disclosure relate to the communication field, in particular to a method and device for wireless communication. A method and device is provided for wireless communication in the present disclosure, which may perform a corresponding setup process of a sensing session according to a type of sensing session, or perform a corresponding teardown process of the sensing session according to the type of sensing session.

According to a first aspect, A method is provided for wireless communication, including that: a sensing initiator performs a setup process of a target sensing session according to a type of the to-be-set up target sensing session.

According to a second aspect, A method is provided for wireless communication, including that: a sensing responder receives a first request frame from a sensing initiator, the first request frame being configured to request a measurement setup, and the measurement setup corresponding to a target sensing session with a pairwise negotiation type.

According to a third aspect, there is provided a sensing initiator, including a processor and a memory. The memory is configured to store a computer program, and the processor is configured to call and execute the computer program stored in the memory to cause the sensing initiator to:

perform a setup process of a target sensing session according to a type of the to-be-set up target sensing session.

According to a fourth aspect, there is provided a sensing responder, including a processor and a memory. The memory is configured to store a computer program, and the processor is configured to call and execute the computer program stored in the memory to cause the sensing responder to:

receive a first request frame from a sensing initiator, the first request frame being configured to request a measurement setup, and the measurement setup corresponding to a target sensing session with a pairwise negotiation type.

BRIEF DESCRIPTION OF THE DRAWINGS

FIG. 3 is a schematic diagram of a method for wireless communication provided by an embodiment of the present disclosure.

FIG. 9 is a schematic diagram of another method for wireless communication provided by an embodiment of the present disclosure.

FIG. 15 is a schematic block diagram of a sensing initiator provided by an embodiment of the present disclosure.

FIG. 16 is a schematic block diagram of a sensing responder provided by an embodiment of the present disclosure.

FIG. 17 is a schematic block diagram of a device for wireless communication provided by an embodiment of the present disclosure.

FIG. 18 is a schematic block diagram of another device for wireless communication provided by an embodiment of the present disclosure.

DETAILED DESCRIPTION

The technical solution in the embodiments of the present disclosure will be described below in conjunction with the drawings in the embodiments of the present disclosure, and it will be apparent that the described embodiments are part of the embodiments of the present disclosure, but not all of them. Based on the embodiments in the present disclosure, all other embodiments obtained by those skilled in the art without making creative efforts fall within the scope of protection of the present disclosure.

The technical solution of the embodiments of the present disclosure may be applied to various communication systems, such as Wireless Local Area Network (WLAN), Wireless Fidelity (WiFi) or other communication systems.

Figure 1:
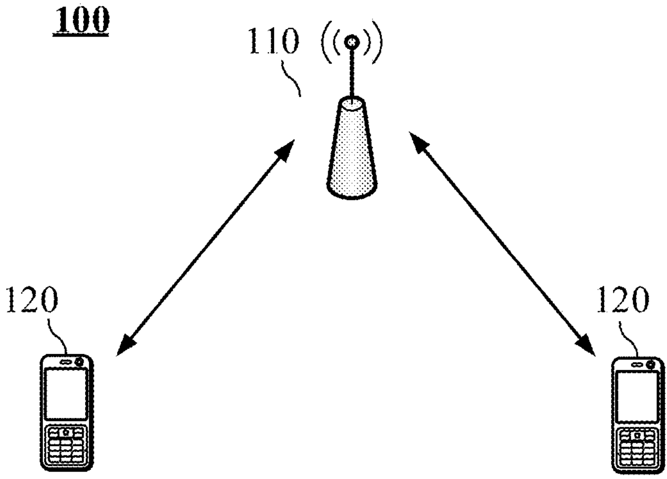
FIG. 1 is a schematic diagram of a communication system architecture provided by an embodiment of the present disclosure.

Exemplarily, a communication system 100 applied in the embodiments of the present disclosure is illustrated in FIG. 1. The communication system 100 may include an Access Point (AP) 110 and a STATION (STA) 120 accessing a network through the AP110.

In the embodiments of the present disclosure, the STA may be a mobile phone, a pad, a computer with wireless transceiver function, a virtual reality (VR) 1 device, an augmented reality (AR) device, a wireless device in industrial control, a wireless device in self driving, a wireless device in remote medical, a wireless device in smart grid, a wireless device in transportation safety, a wireless device in smart city or smart home, etc.

FIG. 1 exemplarily illustrates an AP and two STAs. Optionally, a communication system 100 may include multiple APs and other numbers of STAs, which are not limited by the embodiments of the present disclosure.

It should be understood that a device having a communication function in a network/system in the embodiments of the present disclosure may be referred to as a communication device. Taking the communication system 100 illustrated in FIG. 1 as an example, the communication device may include an AP 110 and STAs 120 having a communication function, the AP 110 and the STAs 120 may be specific devices described above and will not be described here. The communication device may also include other devices in the communication system 100 such as network controllers, mobility gateways and other network entities, which are not limited in the embodiments of the present disclosure.

It should be understood that the terms "system" and "network" of the present disclosure are often used interchangeably herein. In the present disclosure, the term "and/or" is used to describe an association relationship of associated objects, and represents that there may be three relationships. For example, A and/or B may represent the following three situations: i.e., independent existence of A, existence of both A and B and independent existence of B. In addition, the character "/" in the present disclosure generally represents that an "or" relationship is formed between the previous and next associated objects.

It should be understood that the reference to "indicate" in the embodiments of the present disclosure may be a direct indication, may be an indirect indication, or may indicate an association relationship. For example, A indicates B, which may mean that A directly indicates B, for example, B may be obtained through A. It may also mean that A indirectly indicates B, for example, A indicates C, and B may be obtained by C. It may also indicate that there is an association relationship between A and B.

In the description of embodiments of the present disclosure, the term "correspond" may mean that there is a direct correspondence or an indirect correspondence between the two, may also mean that there is an association relationship between the two, may also be a relationship between indication and being indicated, configuration and being configured, etc.

The "STA" described in the embodiments of the present disclosure may be, in particular, "non-AP STA".

In the embodiments of the present disclosure, the "predefined" may be implemented by pre-storing corresponding codes, tables, or other manners that may be used to indicate relevant information in devices (e.g., including APs and STAs), the specific implementation of which is not limited by the present disclosure. For example, predefinition may refer to what is defined in the protocol.

In order to facilitate understanding of the technical solution of the embodiments of the present disclosure, the related term of the present disclosure is explained below.

Association Identifier (AID) is used to identify a terminal associated with the AP.

Media Access Control (MAC) is the abbreviation of media access control address.

Transmission Opportunity (TXOP) refers to a period of time, during which the terminal holding transmission opportunity may initiate one or more transmissions on its own initiative.

WLAN Sensing senses people or objects in the environment by measuring the change of scattering and/or reflection of WLAN signals by people or objects. That is, WLAN Sensing measures and senses a surrounding environment through wireless signals. In this way, it can complete many functions such as detection of whether someone invades, moves, falls, etc., in an indoor environment, or accomplish posture recognition and spatial three-dimensional image construction.

WLAN devices participating in WLAN Sensing may include the following roles:

- a Sensing Initiator, or a sensing initiating device, which is a device that initiates a sensing session and wants to obtain sensing result(s);
- a Sensing Responder, or a sensing response device, which is a device that is non-Sensing Initiator participating in the sensing session;
- a Sensing Transmitter, or a sensing transmitting device, which is a device that initiates sensing illumination signal;
- a Sensing Receiver, or a sensing receiving device, which is a device that receives sensing illumination signal;
- a Sensing processor, which is a device that processes a sensing measurement result;
- a Sensing Participant, which includes the sensing initiator, the sensing transmitter and the sensing receiver.

WLAN terminals may have one or more roles in a sensing session. For example, the sensing initiator may only be the sensing initiator, may also be a sensing transmitter or a sensing receiver, or may also be both a sensing transmitter and a sensing receiver.

Figure 2:
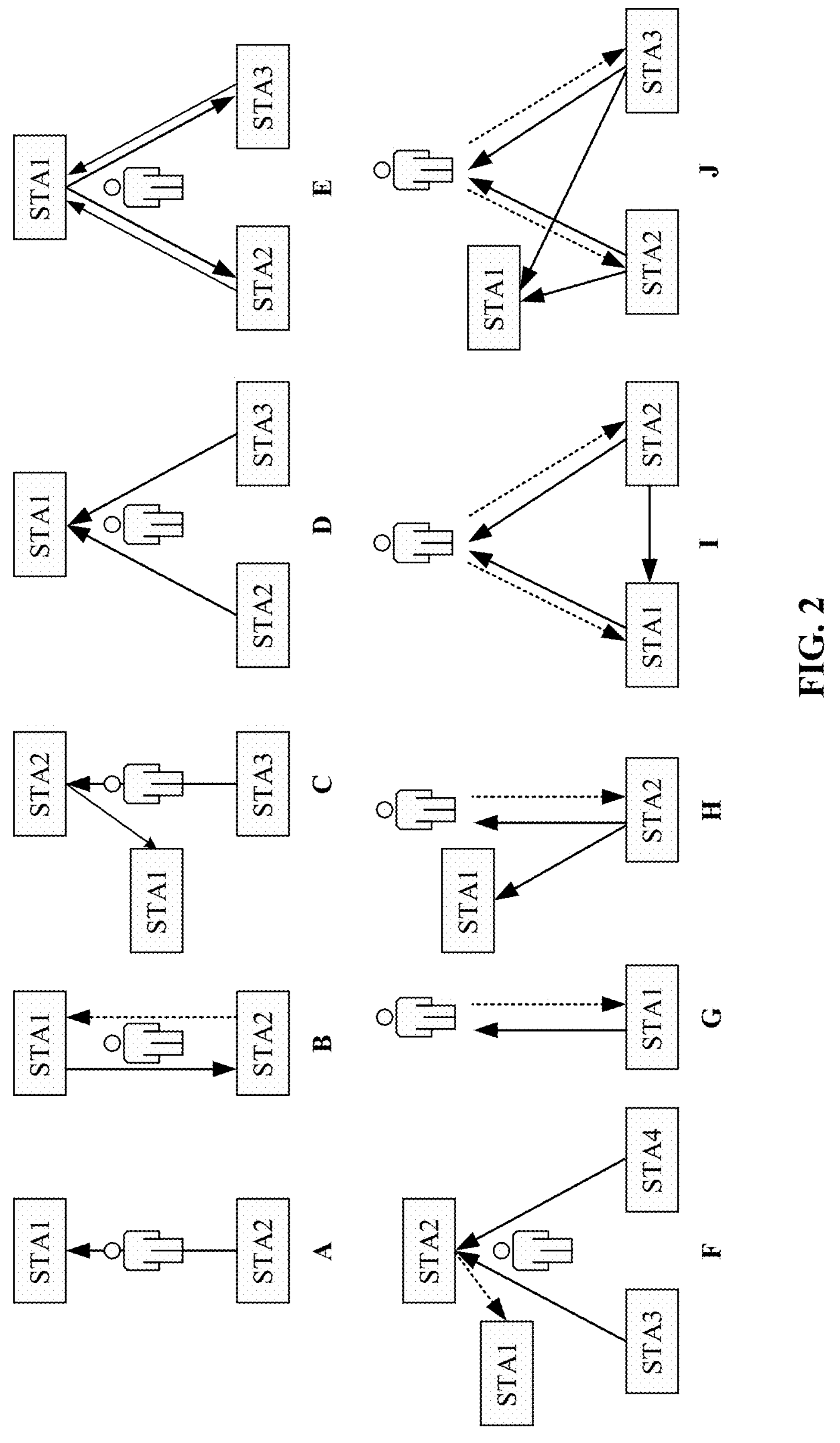
FIG. 2 is a schematic diagram of a Wi-Fi sensing process.

For example, as illustrated in A in FIG. 2, STA1 may be the Sensing Initiator, or the Sensing Receiver, or the Sensing processor. STA2 may be the Sensing Transmitter.

For another example, as illustrated in B in FIG. 2, STA1 may be the Sensing Initiator or the Sensing Transmitter. STA2 may be the Sensing Receiver or the Sensing processor.

For another example, as illustrated in C in FIG. 2, STA1 may be the Sensing Initiator or the Sensing processor. STA2 may be the Sensing Receiver. STA3 may be the Sensing Transmitter.

For another example, as illustrated in D in FIG. 2, STA1 may be the Sensing Initiator, or the Sensing Receiver, or the Sensing processor. STA2 may be the Sensing Transmitter. STA3 may be the Sensing Transmitter.

For another example, as illustrated in E in FIG. 2, STA1 may be the Sensing Initiator, or the Sensing Transmitter, or the Sensing processor. STA2 may be the Sensing Receiver. STA3 may be the Sensing Receiver.

For another example, as illustrated in F in FIG. 2, STA1 may be the Sensing Initiator. STA2 may be the Sensing Receiver, or the Sensing processor. STA3 may be the Sensing Transmitter. STA3 may be the Sensing Transmitter.

For another example, as illustrated in G in FIG. 2, STA1 may be the Sensing Initiator, or the Sensing Transmitter, or the Sensing Receiver, or the Sensing processor.

For another example, as illustrated in H in FIG. 2, STA1 may be the Sensing Initiator. STA2 may be the Sensing Transmitter, or the Sensing Receiver, or the Sensing processor.

For another example, as illustrated in I in FIG. 2, STA1 may be the Sensing Initiator, or the Sensing Transmitter, or the Sensing Receiver, or the Sensing processor. STA2 may be the Sensing Transmitter, or the Sensing Receiver.

For another example, as illustrated in J in FIG. 2, STA1 may be the Sensing Initiator, or the Sensing processor. STA2 may be the Sensing Transmitter, or the Sensing Receiver. STA3 may be the Sensing Transmitter, or the Sensing Receiver. In some embodiments, there may be a plurality of Sensing Types, for example, a sensing type based on Channel State Information (CSI), i.e. CSI-based sensing, which is used to obtain a sensing measurement result by processing CSI of received sensing illumination signal. For another example, a sensing type based on reflected signals, i.e. Radar-based sensing, which is used to obtain the sensing measurement result by processing the reflected signals of received sensing illumination signal.

WLAN sensing session includes one or more of the following stages: a session setup, a sensing measurement, a sensing reporting, and a session teardown.

In a stage of session setup, sensing session(s) are set up, sensing session participants and their roles (including sensing transmitter and sensing receiver) are determined, operational parameters related to the sensing session(s) are determined, and optionally the parameters are interacted between terminals.

In a stage of sensing measurement, sensing measurement(s) are executed, and the sensing transmitter transmits sensing signals to the sensing receiver.

In a stage of sensing reporting, measurement result(s) are reported, which is determined by application scenarios, and the sensing receiver may need to report the measurement result to the sensing initiator.

In a stage of session teardown, the terminal stops measuring and tears down the sensing session(s).

When setting up the sensing session(s), the terminals may need to negotiate the sensing roles and operational parameters one by one, or the terminals may declare their own roles and operational parameters (for example, through beacon frames or other special frames).

The amount of data of a sensing measurement result is usually large. For example, the Channel State Information (CSI) data of one measurement may reach 4K~40K bits. In order to reduce a network load caused by reporting the sensing measurement result, a measurement threshold may be set. When a change between this sensing measurement result and the last sensing measurement result is less than the measurement threshold, the sensing receiver will report the sensing measurement result, otherwise it will not report the sensing measurement result.

The sensing initiator may set multiple sets of measurement parameters, and one set of measurement parameters (identified by Measurement Setup ID, which may be equivalent to a Burst Group) may be applied to multiple measurements (identified by Measurement Instance ID, which may be equivalent to a Burst).

In the related technology, it has not been discussed that the specific setup process of sensing session when the sensing initiator initiates the sensing session (for example, how to determine whether it is necessary to execute the frames interactive process of sensing parameter negotiation) and the specific teardown process of sensing session (for example, whether to execute the frames interactive process of sensing parameter release, etc).

In view of this, the embodiments of the present disclosure provide a method for setting up sensing session(s). The sensing initiator may determine a setup process of a target sensing session to be performed according to the type of the to-be-set up target sensing session, for example, the type of the target sensing session may be indicated through the MLME-SAP interface service primitive. The embodiments of the present disclosure also provide a method for tearing down sensing session(s). The sensing initiator or the sensing responder may determine a teardown process of a target sensing session to be performed according to a type of a to-be-torn down sensing session, for example, information of the to-be-torn down target sensing session may be indicated through the MLME-SAP interface primitive.

FIG. 3 is a schematic flow diagram of a method 200 for wireless communication according to an embodiment of the present disclosure, which is a schematic diagram of the method for setting up a sensing session. As illustrated in FIG. 3, the method 200 includes the following operation.

At S210, a sensing initiator performs a setup process of a target sensing session according to a type of the to-be-set up target sensing session.

In some embodiments, the type of the target sensing session may be a Pairwise negotiation type (also called as a negotiated type), or a non-Pairwise negotiation type (also called as a non-negotiated type), such as an Opportunistic type, a Monostatic radar type, or a Passive type.

It should be understood that for the sensing session with the non-pairwise negotiation type, the sensing initiator may perform sensing measurement without negotiating parameters of the sensing session.

For example, for the sensing session with the Opportunistic type, the sensing initiator monitors any Physical Protocol Data Unit (PPDU) on the operating channel to do measurements.

For example, for the sensing session with the Monostatic radar type, the sensing initiator needs to transmit a sensing signal and receive a reflected signal of the signal to do measurement.

For example, for the sensing session with the Passive type, the sensing initiator needs to obtain measurement time information indicated in a Beacon frame, and monitor the specific PPDU for sensing from other STAs during this time period to do measurement.

It should be understood that embodiments of the present disclosure may be adapted to set up a new sensing session, or may also be adapted to set up a new measurement setup in an existing sensing session, and therefore, in some embodiments, S210 may be replaced by the following operation.

The sensing initiator performs a setup process of a target sensing session according to a type of a sensing session corresponding to the to-be-set up measurement setup.

That is to say, setting up a new sensing session or a new measurement setup in an existing sensing session, may include performing the corresponding setup process of the sensing session according to the type of sensing session. That is, the target sensing session may be a new sensing session, or an existing sensing session (in other words, a sensing session having been set up).

For example, when the target sensing session is of a pairwise negotiation type, the sensing initiator allocates a resource for the target sensing session, and/or transmits a first request frame to a sensing responder, where the first request frame is configured to request a measurement setup for the target sensing session.

For another example, when the target sensing session is of a non-pairwise negotiation type, the sensing initiator allocates a resource for a sensing session with the non-pairwise negotiation type.

In some embodiments, the operation that the sensing initiator allocates the resource for the target sensing session may include that the sensing initiator allocates a resource for the target sensing session to perform sensing measurement subsequently, such as a resource for a sensing transmitter to transmit measurement signals, such as frequency resource units, space-time flow allocation information, etc. Optionally, storage resources for storing the measurement result may be included and the present disclosure is not limited thereto.

In some embodiments the first request frame may be used to request a setup of one measurement setup or a plurality of measurement setups in the target sensing session.

In some embodiments, the first request frame is referred to as a measurement setup request frame.

In some embodiments, the sensing initiator indicates a type of the target sensing session through a media access control sublayer management entity service access point (MLME-SAP) interface service primitive.

In some embodiments, the setup process of the target sensing session may be based on an indication from an upper layer application of the sensing initiator. For example, when confirming that a target sensing session needs to be set up, the upper layer application of the sensing initiator calls an interface provided by a Station Management Entity (SME) to initiate a setup process of the sensing session. Specifically, the upper layer application calls an interface provided by the SME, so that the SME calls a first MLME-SAP interface primitive to realize the setup of the sensing session.

In some embodiments, the upper layer application may refer to an application above the MAC layer, such as a Wi-Fi driver or a wpa_supplicant tool application or the like.

In some embodiments, the first MLME-SAP interface primitive, or called as a sensing request setup primitive, is denoted MLME-SENSSETUP.request.

In some embodiments, the first MLME-SAP interface primitive is used to indicate a type of target sensing session. Optionally, the first MLME-SAP interface primitive is used to indicate to perform a corresponding setup process of the sensing session according to the type of the target sensing session. For example, a sensing measurement is to be initiated and/or a first request frame is to be transmitted.

In some embodiments, the first MLME-SAP interface primitive is configured to indicate at least one of:

the type of the target sensing session, a session identification (ID) of the target sensing session, a measurement setup identification (ID), a duration of a measurement, a number of repetitions of the measurement, an interval time of the measurement, or a sensing request parameter, where the sensing request parameter includes an identity identification of a sensing responder, parameters of sensing session to be negotiated, etc.

By way of example and not limitation, the first MLME-SAP interface primitive may be represented as:

```
MLME-SENSSETUP.request(
Type,
Dialog Token,
Measurement Setup ID,
Duration,
Number of Repetitions,
Interval,
SENS Request Set,
VendorSpecificInfo
)
```

where the Type field indicates a type of sensing session, or a sensing type.

For example, a value of 0 indicates an Opportunistic type, a value of 1 indicates a Monostatic radar type, a value of 2 indicates a Passive type, and a value of 3 indicates a Pairwise negotiation type.

Dialog Token field indicates a session ID of the to-be-set-up sensing session.

Measurement Setup ID field indicates an ID of the to-be-set-up measurement setup.

Duration field indicates a duration of the measurement.

Number of Repetitions field indicates the number of repetitions of the measurement.

SENS Request Set field indicates an ID of the peer device and the parameters of the sensing session to be negotiated, for example, an Associated ID (AID), an Unassociated ID (UID), or a MAC address.

VendorSpecificInfo field indicates vendor specific information.

After the SME of the sensing initiator indicates the sensing type of the target sensing session to the MAC sublayer management entity (MLME) of the sensing initiator via the first MLME SAP interface primitive, the MLME may execute the corresponding a setup process of a sensing session according to the type of the target sensing session.

The following illustrates the specific implementation of a setup process of a target sensing session combined with the types of target sensing session.

Embodiment 1: the type of the target sensing session is a non-pairwise negotiation type.

For example, the type is an Opportunistic type, a Monostatic radar type or a Passive type.

In this situation, the MLME of the sensing initiator notifies the MAC sublayer of the sensing initiator to allocate a resource required for the target sensing session with the non-pairwise negotiation type, and/or the MLME of the sensing initiator transmits first indication information to the SME of the sensing initiator for indicating a setup result of the target sensing session, such as setup success or setup failure.

In the embodiment 1, the sensing initiator may be a station device (such as a non-AP STA), or an access point device.

In some embodiments, the first indication information may also be implemented through an MLME-SAP interface primitive, and is denoted as MLME-SENSSETUP.confirm.

In some embodiments, the first indication information may be configured to indicate at least one of:

a session ID corresponding to a target sensing session, a measurement setup ID, a status and a sensing request parameter.

The status is configured to indicate the setup result of the target sensing session, such as setup success or setup failure.

By way of example and not limitation, the MLME-SENSSETUP.confirm may be represented as:

```
MLME-SENSSETUP.confirm (
Dialog Token,
Measurement Setup ID,
Status,
SENS Request Set,
VendorSpecificInfo
)
```

where Dialog Token field indicates a session ID of the target sensing session.

Measurement Setup ID field indicates an ID of the measurement setup.

Status field indicates the setup result of the sensing session.

As an example, a value of 1 indicates a successful setup, and a value of 0 indicates a failed setup.

SENS Request Set field indicates parameters of the sensing session.

VendorSpecificInfo field indicates vendor specific information.

Embodiment 2: the type of the target sensing session is a pairwise negotiation type.

In this situation, the MLME of the sensing initiator notifies the MAC sublayer of the sensing initiator to allocate a resource for the target sensing session with the pairwise negotiation type, and/or the MLME of the sensing initiator transmits first request frame to the sensing responder.

In the embodiment 2, the sensing initiator may be a station device, such as a non-AP STA, and the sensing responder may be an access point device. Alternatively, the sensing initiator may be an access point device, and the sensing responder may be a station device, such as a non-AP STA.

In some embodiments, the first request frame includes a session ID and/or a measurement setup ID. The session ID may refer to a session ID corresponding to a to-be-set up sensing session, and the measurement setup ID may refer to a measurement setup ID corresponding to a to-be-set up measurement setup.

The ID carried in the first request frame will be described in connection with a specific scenario as follows.

Situation 1:

The target sensing session corresponds to one measurement setup, or the stage of session setup of the target sensing session only includes one interaction flow of measurement setup frames.

In this situation, the first request frame may carry a measurement setup ID, or a session ID. The measurement setup ID may be a measurement setup ID corresponding to the one measurement setup ID in the target sensing session, and the session ID is a session ID of the target sensing session.

Optionally, there is one or more sensing session (including the target sensing session) between the sensing initiator and the sensing responder, where each sensing session corresponds to an independent session ID.

In the situation 1, there is a one-to-one correspondence between the measurement setup ID and the session ID, or the measurement setup ID is same as the session ID.

Optionally, in the situation 1, the Dialog Token field in the first MLME-SAP interface primitive may also be used to indicate a measurement setup ID.

Situation 2:

The target sensing session corresponds to a plurality of measurement setups, or the stage of session setup of the target sensing session includes a plurality of interaction flows of measurement setup frames. There is only one sensing session between the sensing initiator and the sensing responder, that is, there is only the target sensing session between the sensing responder and the sensing initiator.

In this situation, the first request frame may carry a measurement setup ID, without a session ID; or the first request frame may carry the measurement setup ID and the session ID. The measurement setup ID may be a measurement setup ID corresponding to the to-be-set up target measurement setup in the target sensing session. Other measurement setups are also included in the target sensing session.

Optionally, the target sensing session may be a sensing session having been set up (denoted as situation 2-1), or may be a to-be-set up sensing session (denoted as situation 2-2).

Optionally, in the situations 2-1 and 2-2, the first request frame may only carry the measurement setup ID. For example, if there is no sensing session currently between the sensing initiator and the sensing responder (for example, the sensing session has not been set up, or the sensing session having been set up has been torn down). In this situation, a new sensing session is set up implicitly when performing the measurement setup. If there is one sensing session currently between the sensing initiator and the sensing responder, the new measurement setup is subordinate to the current sensing session.

Optionally, in the situations 2-1 and 2-2, the first request frame may carry a measurement setup ID and a session ID. If the sensing initiator indicates the session ID explicitly, the session ID should also be carried explicitly at the subsequent teardown of the measurement and teardown of the session.

Optionally, in the situation 2, the first MLME-SAP interface primitive may not include a Dialog Token field, or a value of the Dialog Token field takes a reserved value.

Situation 3:

The target sensing session corresponds to a plurality of measurement setups, or the stage of session setup of the target sensing session includes a plurality of interaction flows of measurement setup frames. In this situation, there are a plurality of sensing sessions (including the to-be-set up target sensing session) between the sensing initiator and the sensing responder.

In this situation, the session ID and the measurement setup ID are carried in the first request frame. The session ID is a session ID of the target sensing session, and the measurement setup ID is a measurement setup ID corresponding to the to-be-set up measurement setup in the target sensing session.

Optionally, in the situation 3, the target sensing session is a sensing session having been set up between the sensing initiator and the sensing responder, and the to-be-set up measurement setup is a new measurement setup in the sensing session having been set up.

Optionally, in the situation 3, the target sensing session is a new sensing session to be set up between the sensing initiator and the sensing responder, and the to-be-set up measurement setup is a new measurement setup in the new sensing session to be set up.

It should be understood that in the embodiments of the present disclosure, one interaction flow of measurement setup frames may refer to one interaction flow of a measurement setup request frame and a measurement setup response frame, and one interaction flow of measurement setup frames may be used to set up one measurement setup.

After the sensing responder has received the first request frame of the sensing initiator, in some embodiments, the method 200 further includes the following operation.

The sensing responder allocates a resource for the target sensing session, and/or transmits a first response frame to the sensing initiator, the first response frame being configured to indicate response information for a measurement setup.

In some embodiments, the operation that the sensing responder allocates the resource for the target sensing session may include that the sensing responder allocates a resource for the target sensing session to perform sensing measurement subsequently, or storage resources for the storing measurement result may also be included, and the present disclosure is not limited thereto.

In some embodiments, the first response frame is referred to as a measurement setup response frame.

In some embodiments, after the sensing responder has received the first request frame, the MLME of the sensing responder transmits third indication information to the SME of the sensing responder, the third indication information being configured to indicate that the sensing responder has received the first request frame from the sensing initiator.

In some embodiments, the third indication information may also be implemented through an MLME-SAP interface primitive.

In some embodiments, a primitive corresponding to the third indication information may be referred to as a sensing setup notification primitive, and is denoted as MLME-SENSSETUP.indication.

In some embodiments, the third indication information is configured to indicate at least one of:

the type of the sensing session, a session ID, a measurement setup ID, a duration of a measurement, a number of repetitions of the measurement, an interval time of the measurement, or a sensing request parameter, where the sensing request parameter includes parameters of sensing session.

In some implementations, the MLME-SENSSETUP.indication may be represented as:

```
MLME-SENSSETUP.indication(
Type,
Dialog Token,
Measurement Setup ID,
Duration,
Number of Repetitions,
Interval,
SENS Request Set,
VendorSpecificInfo
)
```

where the Type field indicates a type of sensing session, or a sensing type.

For example, a value of 0 indicates an Opportunistic type, a value of 1 indicates a Monostatic radar type, a value of 2 indicates a Passive type, and a value of 3 indicates a Pairwise negotiation type.

Dialog Token field indicates a session ID of the to-be-set-up sensing session.

Measurement Setup ID field indicates an ID of the to-be-set-up measurement setup.

Duration field indicates a duration of the measurement.

Number of Repetitions field indicates the number of repetitions of the measurement.

SENS Request Set field indicates the ID of the sensing responder and the parameters of the sensing session to be negotiated, for example, an Associated ID (AID), an Unassociated ID (UID), or a MAC address.

VendorSpecificInfo field indicates vendor specific information.

Further, an SME of the sensing responder calls a second MLME-SAP interface primitive to indicate that an MLME of the sensing responder notifies a media access control (MAC) sublayer of the sensing responder to allocate a resource for the target sensing session and/or the MLME of the sensing responder transmits a first response frame to the sensing initiator.

In some embodiments, the second MLME-SAP interface primitive is configured to indicate at least one of:

a session ID of the target sensing session, a measurement setup ID, feedback information for the measurement setup by the sensing responder, or a sensing response set, where the sensing response set is configured to indicate a parameter determined by the sensing responder for setting up a sensing session.

In some embodiments, the second MLME-SAP interface primitive, or called as a sensing setup response primitive, is denoted as MLME-SENSSETUP.response.

By way of example and not limitation, the MLME-SENSSETUP.response may be represented as:

```
MLME-SENSSETUP.response(
Dialog Token,
Measurement Setup ID,
Status,
SENS Request Set,
VendorSpecificInfo
)
```

where Dialog Token field indicates an ID of the target sensing session.

Measurement Setup ID field indicates an ID of the measurement setup.

Status field is used to indicate feedback information by the sensing responder for the measurement setup.

As an example, for example, 0 means Accept and 1 means Reject.

SENS Response Set field indicates the parameters of sensing session determined by the sensing responder.

Optionally, the SENS Response Set field exists when the status indicates Accept, otherwise the SENS Response Set field may be not included.

In some embodiments, the SME of the sensing responder may call the second MLME-SAP interface primitive based on an indication from an upper layer application, such as an upper layer application schedules an interface provided by the SME so that the SME calls the second MLME-SAP interface primitive.

In some embodiments, the first response frame includes a measurement setup ID and/or a session ID. The session ID may refer to a session ID corresponding to a set up sensing session accepted by the sensing responder, and the measurement setup ID may refer to a measurement setup ID corresponding to a set up measurement setup accepted by the sensing responder.

The ID carried in the first response frame will be described in detail in connection with a specific scenario as follows.

Situation 1:

The target sensing session corresponds to one measurement setup, or the stage of session setup of the target sensing session only includes one interaction flow of measurement setup frames.

In this situation, the first response frame may carry a measurement setup ID, or a session ID. The measurement setup ID may be a measurement setup ID corresponding to the one measurement setup ID in the target sensing session, and the session ID is a session ID of the target sensing session.

Optionally, there is one or more sensing session (including the target sensing session) between the sensing initiator and the sensing responder, where each sensing session corresponds to an independent session ID.

In the situation 1, there is a one-to-one correspondence between the measurement setup ID and the session ID, or the measurement setup ID is same as the session ID.

Optionally, in a situation 2, the Dialog Token field in the second MLME-SAP interface primitive may also be used to indicate a measurement setup ID.

Situation 2:

The target sensing session corresponds to a plurality of measurement setups, or the stage of session setup of the target sensing session includes a plurality of interaction flows of measurement setup frames. There is only one sensing session between the sensing initiator and the sensing responder, that is, there is only the target sensing session between the first device and the second device.

In this situation, the first response frame carries a measurement setup ID, without a session ID. Optionally, the first response frame may also carry the measurement setup ID and the session ID. The measurement setup ID may be a measurement setup ID corresponding to the to-be-set up target measurement setup in the target sensing session. Other measurement setups are also included in the target sensing session.

Optionally, the target sensing session may be a sensing session having been set up (denoted as situation 2-1), or may be a to-be-set up sensing session (denoted as situation 2-2).

Optionally, in the situations 2-1 and 2-2, the first response frame may carry only measurement setup ID. For example, if there is no sensing session currently between the sensing initiator and the sensing responder (for example, the sensing session has not been set up, or the set up sensing session has been torn down), in this situation, a new sensing session is set up implicitly when performing the measurement setup. If there is one sensing session currently between the sensing initiator and the sensing responder, the measurement setup may be subordinated to the current sensing session.

Optionally, in the situations 2-1 and 2-2, the first response frame may carry a measurement setup ID and a session ID. If the sensing initiator indicates the session ID explicitly, the session ID should also be carried explicitly at the subsequent teardown of the measurement and teardown of the session.

Optionally, in the situation 2, the second MLME-SAP interface primitive may not include a Dialog Token field, or a value of the Dialog Token field takes a reserved value.

Situation 3:

The target sensing session corresponds to a plurality of measurement setups, or the stage of session setup of the target sensing session includes a plurality of interaction flows of measurement setup frames. In this situation, there are a plurality of sensing sessions (including the to-be-set up target sensing session) between the sensing initiator and the sensing responder.

In this situation, the first response frame carries the session ID and the measurement setup ID. The session ID is a session ID of the target sensing session, and the measurement setup ID is a measurement setup ID corresponding to the to-be-set up measurement setup in the target sensing session.

Optionally, in the situation 3, the target sensing session is a sensing session having been set up between the sensing initiator and the sensing responder, and the to-be-set up measurement setup is a new measurement setup in the sensing session having been set up.

Optionally, in the situation 3, the target sensing session is a new sensing session to be set up between the sensing initiator and the sensing responder, and the to-be-set up measurement setup is a new measurement setup in the new sensing session to be set up.

In some embodiments, the method 200 further includes the following operation.

An MLME of the sensing initiator transmits second indication information to an SME of the sensing initiator, the second indication information being configured to indicate that the sensing initiator has received the first response frame from the sensing responder.

In some embodiments, the second indication information is implemented through an MLME-SAP interface primitive, In some embodiments, the primitive corresponding to the second indication information, or called as a sensing setup confirmation primitive, is denoted as MLME-SENSSETUP.confirm.

By way of example and not limitation, the MLME-SENSSETUP.confirm may be represented as:

```
MLME-SENSSETUP.confirm (
Dialog Token,
Measurement Setup ID,
Status,
SENS Request Set,
VendorSpecificInfo
)
```

where Dialog Token field indicates a session ID of the sensing session.

Measurement Setup ID field indicates an ID of the measurement setup.

Status field indicates the setup result of sensing session. As an example, a value of 1 indicates a successful setup, and a value of 0 indicates a failed setup.

SENS Request Set field indicates a parameter of the sensing session.

VendorSpecificInfo field indicates vendor specific information.

Figure 4:
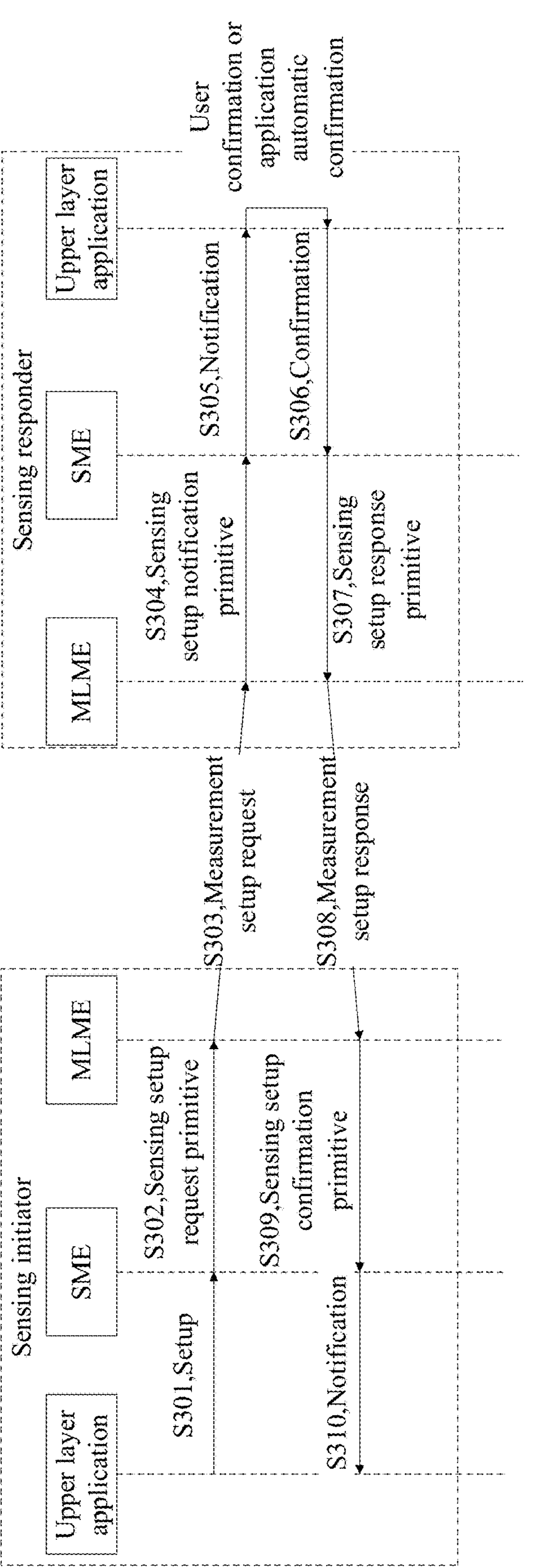
FIG. 4 is a schematic interaction diagram of a method for setting up a sensing session according to an embodiment of the present disclosure.

With reference to FIG. 4, the overall setup process of a sensing session according to the embodiments of the present disclosure will be explained.

It should be understood that the implementation details in the respective operations illustrated in FIG. 4 refer to the specific description of the previous embodiments and are not repeated here for the sake of brevity.

As illustrated in FIG. 4, the method 300 may include the following operations.

At S301, when the upper layer application of the sensing initiator confirms the setup of the target sensing session, the interface of the SME of the sensing initiator is called to indicate the setup of the target sensing session to the SME.

At S302, the SME of the sensing initiator calls the sensing setup request primitive to indicate the MLME of the sensing initiator to execute a setup process of the target sensing session according to the type of the target sensing session.

The sensing setup request primitive may be used to indicate the type of to-be-setup target sensing session.

For example, if the target sensing session is of a non-pairwise negotiation type, the MLME of the sensing initiator notifies the MAC sublayer of the sensing initiator to allocate a resource required for the target sensing session with the non-pairwise negotiation type, and/or the MLME of the sensing initiator transmits first indication information to the SME of the sensing initiator for indicating a setup result of the target sensing session, such as setup success or setup failure.

For another example, if the target sensing session is of a pairwise negotiation type, the MLME of the sensing initiator notifies the MAC sublayer of the sensing initiator to allocate a resource for the target sensing session with the pairwise negotiation type, and/or the MLME of the sensing initiator transmits a measurement setup request frame to the sensing responder.

At S303, when the target sensing session is of pairwise negotiation type, the MLME of the sensing initiator transmits a measurement setup request frame to the MLME of the sensing responder.

At S304, after receiving the measurement setup request frame, the MLME of the sensing responder notifies the SME of the sensing response device that the sensing responder has received the measurement setup request frame from the sensing initiator through the sensing setup notification primitive.

At S305, the SME of the sensing responder notifies the upper application of the sensing responder.

At S306, the upper application of the sensing responder transmits the acknowledge information to the SME of the sensing responder.

At S307, the SME of the sensing responder indicates the MLME of the sensing responder to allocate a resource for the target sensing session through the sensing setup response primitive and transmits a measurement setup response frame to the sensing initiator.

At S308, after having received the measurement setup response frame, the MLME of the sensing initiator notifies the SME of the sensing initiator through the sensing setup confirmation primitive that the sensing initiator has received the measurement setup response frame from the sensing responder.

At S309, the SME of the sensing initiator has received the measurement setup response frame from sensing responder through the upper application of the sensing initiator, thus realizing the setup of the target sensing session.

The frame format designs of the first request frame and the first response frame are described below.

It should be understood that the frame format of the first request frame and the first response frame illustrated in FIG. 5 to FIG. 8 is only an example, and other frame formats obtained by transforming the frame format according to the example of the present disclosure fall within the scope of protection of the present disclosure, and the present disclosure is not limited thereto.

In some embodiments, the first request frame is implemented via an Action frame or an action no acknowledge frame (Action No Ack frame). That is, a measurement setup request frame may be achieved through the Action frame or the Action No Ack frame.

In some embodiments, the first response frame is implemented via an Action frame or an Action No Ack frame. That is, a measurement setup response frame may be achieved through the Action frame or the Action No Ack frame.

In some embodiments, at least one field in the Action frame or Action No Ack frame may be utilized to indicate that the Action frame or Action No Ack frame is a measurement setup request frame or a measurement setup response frame.

That is, the first request frame and the first response frame may be considered as sensing action frames.

In some embodiments, the Action frame or Action No Ack frame includes an action field, the action field includes an action category field, a public action subtype field and a sensing subtype field, and the Action frame or Action No Ack frame is indicated as a measurement setup request frame or a measurement setup response frame jointly by values of the action category field, the public action subtype field and the sensing subtype field.

As an example, a value of the action category field of 4 indicates that the frame is a public action frame, a value of the public action subtype field being a reserved value (for example, any numerical value in the range of 46~255, which is explained by taking 46 as an example below) indicates that the frame is sensing action frame, and further a value of the sensing subtype indicates that the sensing action frame is a measurement setup request frame or a measurement setup response frame.

For example, a first value of the sensing subtype indicates that the sensing action frame is a measurement setup request frame, and a second value of the sensing subtype indicates that the sensing action frame is a measurement setup response frame, where the first value and the second value are different.

As an example, the first value is 0 and the second value is 3.

Figure 5:
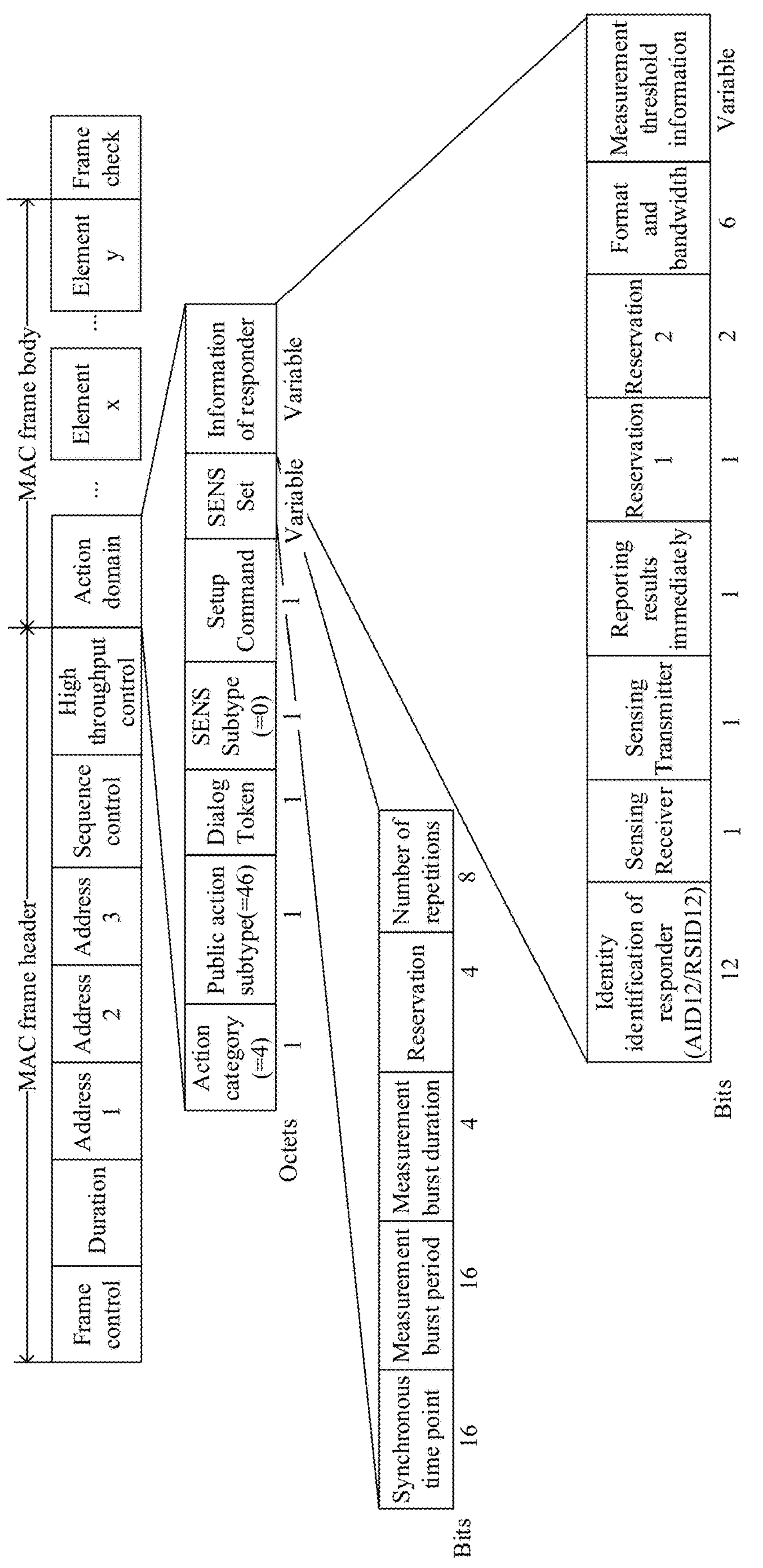
FIG. 5 is a schematic diagram of a frame format of a measurement setup request frame according to an embodiment of the present disclosure.

FIG. 5 is a schematic diagram of a frame format of a measurement setup request frame according to an embodiment of the present disclosure. In the frame format, a value of the action category field of 4 indicates that the frame is a public action frame, a value of the public action subtype field of 46 indicates that the frame is sensing action frame, and a value of the sensing subtype of 0 indicates that the frame is a measurement setup request frame.

In some embodiments, as illustrated in FIG. 5, the measurement setup request frame may also include at least one of the following fields.

It should be understood that the correspondence between the meanings and values of the following fields is only an example, it is just ensured that each meaning corresponds to a unique value, and the present disclosure is not limited thereto.

Dialog Token field indicates a session ID corresponding to the to-be-set up target sensing session.

Sensing Parameters field indicates the sensing session parameters that the sensing initiator requested to negotiate.

In the above situation 1, the Dialog Token field may also be used to indicate the measurement setup ID.

Setup Command field indicates that a sensing session setup is configured in a manner such as mandatory or recommendation.

As an example, a value of 0 means Demand, and a value of 1 means Suggest.

Number of repetitions indicates information of the number of repetitions of the measurement.

As an example, a value of 0 indicates that there is no maximum number limit (in this situation, the measurement may only be released explicitly), and a value of 1 to 255 indicates the maximum number of repetitions (in this situation, the measurement may be released implicitly, for example, released automatically after the maximum number of repetitions is reached).

In another embodiment, the number of repetitions field may be replaced by a duration field indicating a duration of the measurement, or a teardown time of the measurement.

As an example, a value of 0 indicates that no teardown time is set (in this situation, the measurement may only be released explicitly), and a value of 1 to 255 indicates a teardown time in seconds/minutes/hour (in this situation, the measurement may be released implicitly, for example, released automatically after the set teardown time is reached).

The frame format of the measurement setup request frame in FIG. 5 may be applied to the aforementioned situation 1.

Figure 6:
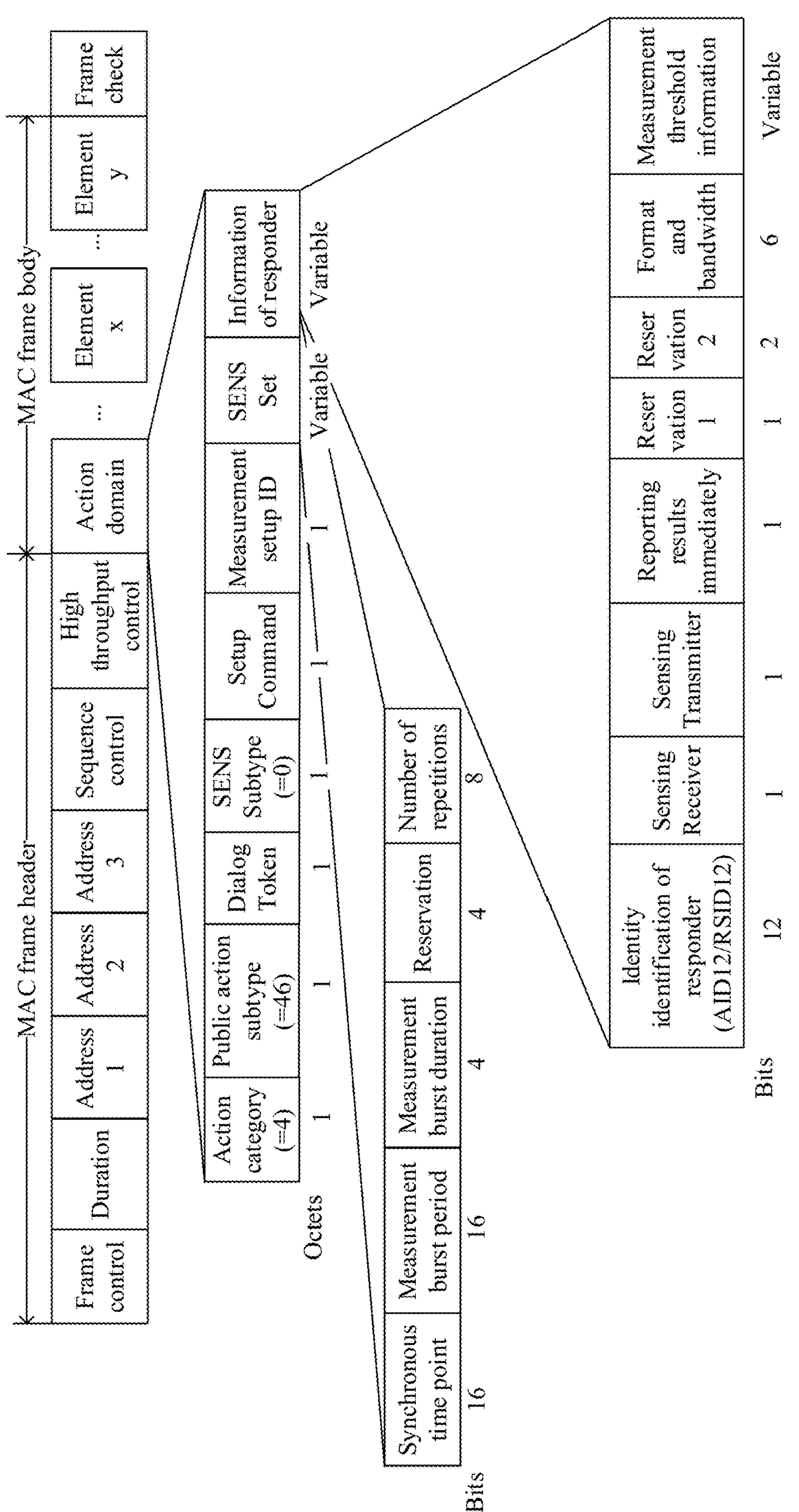
FIG. 6 is a schematic diagram of a frame format of a measurement setup request frame according to another embodiment of the present disclosure.

FIG. 6 is a schematic diagram of a frame format of a measurement setup request frame according to another embodiment of the present disclosure. In the frame format, a value of the action category field of 4 indicates that the frame is a public action frame, a value of the public action subtype field of 46 indicates that the frame is sensing action frame, and a value of the sensing subtype of 0 indicates that the frame is a measurement setup request frame.

The difference from the frame format of the measurement setup request frame in FIG. 5 is that a Measurement Setup ID field is newly added to indicate a Measurement Setup ID in FIG. 6. Therefore, the frame format of the measurement setup request frame in FIG. 6 may be applied to the aforementioned situation 2 and situation 3.

Figure 7:
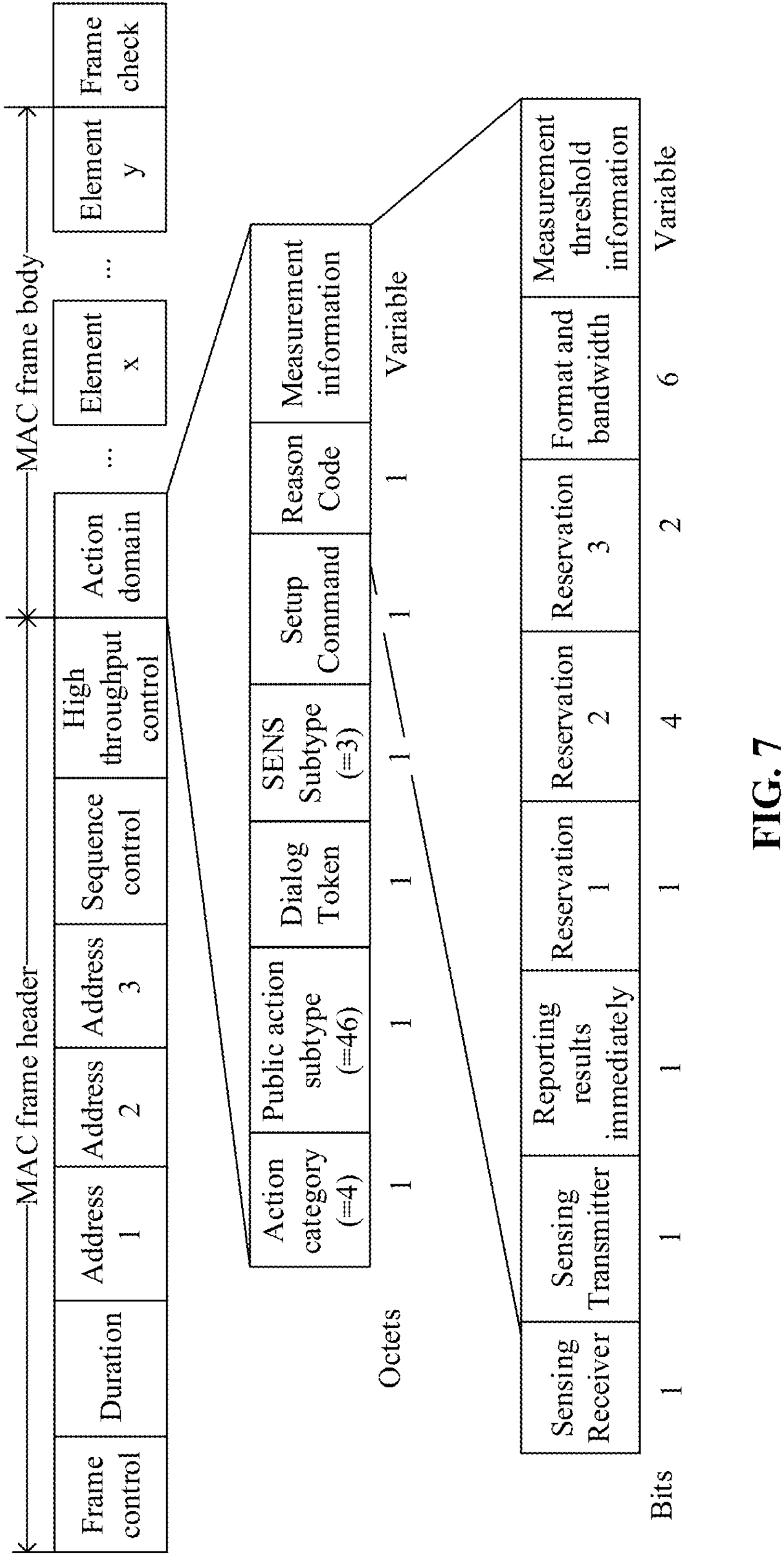
FIG. 7 is a schematic diagram of a frame format of a measurement setup response frame according to an embodiment of the present disclosure.

FIG. 7 is a schematic diagram of a frame format of a measurement setup response frame according to an embodiment of the present disclosure. In the frame format, a value of the action category field of 4 indicates that the frame is a public action frame, a value of the public action subtype field of 46 indicates that the frame is sensing action frame, and a value of the sensing subtype of 3 indicates that the frame is a measurement setup response frame.

In some embodiments, as illustrated in FIG. 7, the measurement setup response frame may also include at least one of the following fields.

Dialog Token field indicates the measurement setup ID.

In the above situation 1, the Dialog Token field may also be used to indicate the measurement setup ID.

Measurement information field indicates the parameters of sensing session determined by the sensing responder.

The frame format of the measurement setup response frame in FIG. 7 may be applied to the aforementioned situation 1.

Figure 8:
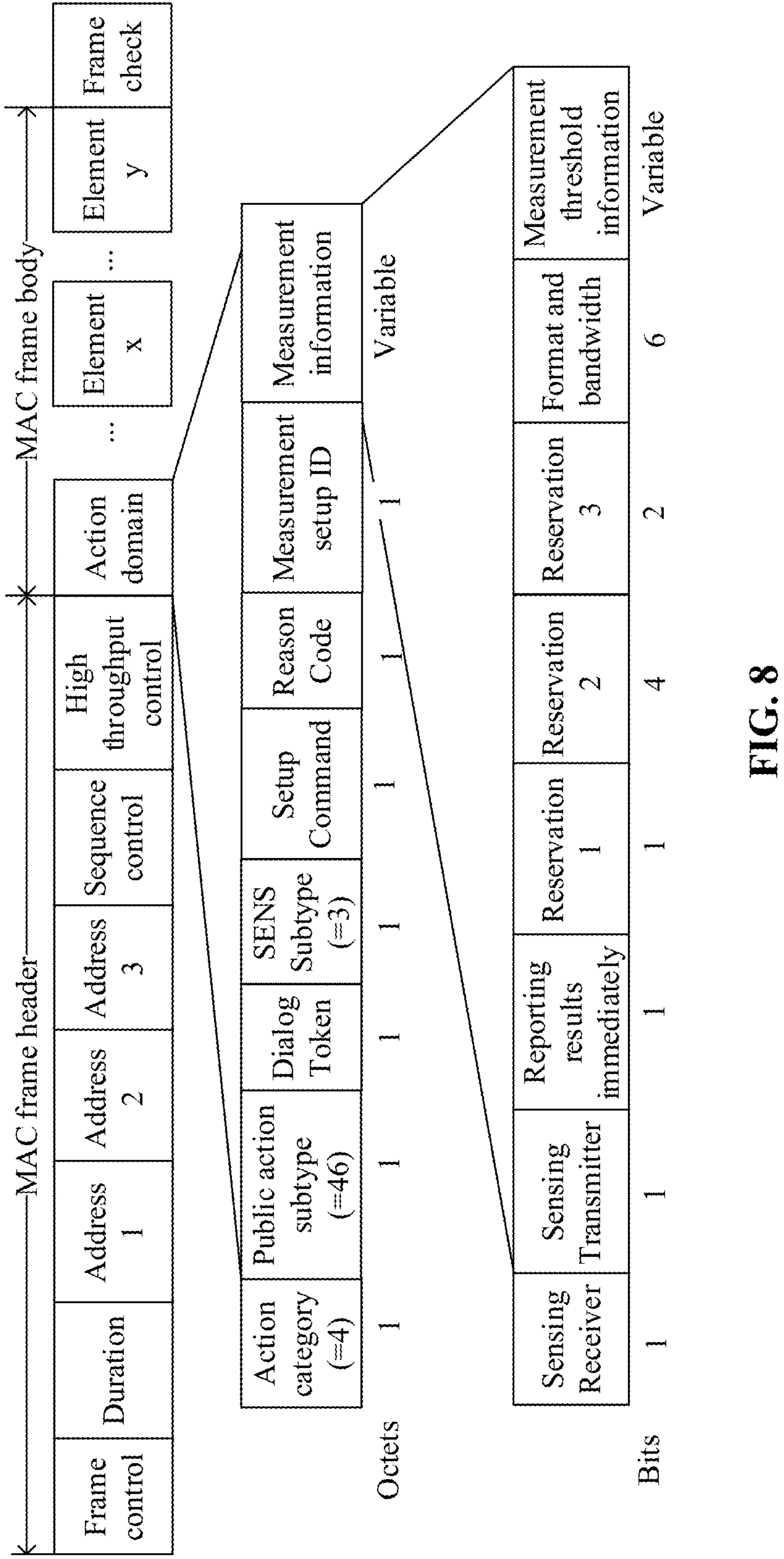
FIG. 8 is a schematic diagram of a frame format of a measurement setup response frame according to another embodiment of the present disclosure.

FIG. 8 is a schematic diagram of a frame format of a measurement setup response frame according to another embodiment of the present disclosure. In the frame format, a value of the action category field of 4 indicates that the frame is a public action frame, a value of the public action subtype field of 46 indicates that the frame is sensing action frame, and a value of the sensing subtype of 3 indicates that the frame is a measurement setup response frame.

The difference from the frame format of the measurement setup response frame in FIG. 7 is that a Measurement Setup ID field is newly added to indicate a Measurement Setup ID in FIG. 8. Therefore, the frame format of the measurement setup response frame in FIG. 8 may be applied to the aforementioned situation 2 and situation 3.

FIG. 9 is a schematic flow diagram of a method 400 for wireless communication according to another embodiment of the present disclosure, which is a schematic diagram of the method of a teardown of a sensing session.

As illustrated in FIG. 9, the method 400 includes the following operation.

At S410, a first device performs a teardown process of a target sensing session according to the type of the to-be-torn down target sensing session, where the first device is a sensing initiator or a sensing responder.

That is, the teardown process of the sensing session may be initiated by the sensing initiator, or may be initiated by the sensing responder.

In some embodiments, the type of the target sensing session may be a Pairwise negotiation type, or a non-Pairwise negotiation type, such as an Opportunistic type, a Monostatic radar type, or a Passive type.

It should be understood that embodiments of the present disclosure may be adapted to a teardown of a sensing session, or may also be adapted to a teardown of a measurement setup in a sensing session. Therefore, in some embodiments, S410 may be replaced by the following operation:

The sensing initiator performs a teardown process of a target sensing session according to the type of the sensing session corresponding to the to-be-torn down measurement setup.

In some embodiments, when the target sensing session is of a non-pairwise negotiation type, the first device releases a target resource corresponding to the target sensing session. For example, all resources allocated for the target sensing session (such as storage resources) or resources for measurements, are released.

In another example, when the target sensing session is of a pairwise negotiation type, the first device releases the target resource corresponding to the target sensing session, and/or the first device transmits a second request frame to a second device, where the second request frame is configured to request a release of the target resource corresponding to the target sensing session, and the second device is a sensing responder or a sensing initiator.

In some embodiments, the second request frame may be used to request releasing the target sensing session, or one measurement setup or a plurality of measurement setups in the target sensing session.

In some embodiments, the second request frame, is also called as a measurement teardown request frame or a sensing teardown request frame.

In some embodiments, the first device indicates a to-be-torn down target sensing session through a third media access control sublayer management entity service access point (MLME-SAP) interface primitive, or, according to the type of the to-be-torn down target sensing session, performs a teardown process of the target sensing session, such as a teardown of sensing measurement and/or transmitting a second request frame.

In some embodiments, the teardown process of the target sensing session may be based on an indication of an upper layer application of the first device, or the teardown process of the target sensing session is triggered by an upper layer application. For example, when the target sensing session needs to be torn down, the upper layer application of the first device may call the interface provided by SME to initiate the teardown process of the target sensing session. Specifically, the upper layer application calls an interface provided by SME, so that SME calls the third MLME-SAP interface primitive to realize the teardown of the sensing session.

In some embodiments, the upper layer application may refer to an application above the MAC layer, such as a Wi-Fi driver or a wpa_supplicant tool application or the like.

In some embodiments, the third MLME-SAP interface primitive, or called as a sensing teardown request primitive or a measurement teardown request primitive, is denoted as MLME-SENSTEARDOWN.request.

In some embodiments, the third MLME-SAP interface primitive is configured to indicate at least one of:

a session ID of the target sensing session, or a measurement setup ID list corresponding to a to-be-torn down measurement setup.

By way of example and not limitation, the third MLME-SAP interface primitive may be represented as:

```
MLME-SENSTEARDOWN.request(
Dialog Token,
Number of Setups,
Measurement Setup ID list,
VendorSpecificInfo
)
```

where Dialog Token field indicates an ID of the to-be-torn down sensing session.

Number of Setups field indicates the number information of the to-be-torn down measurement setup(s). For example, a value of 1 to 255 indicates the number of setups to be released. Optionally, a value of 0 indicates that all resources of all set up measurements are released.

Measurement Setup ID list field indicates ID(s) of one or more measurement setup(s) to be released.

VendorSpecificInfo field indicates vendor specific information.

In some embodiments, after the SME of the first device indicates the information of the to-be-torn down target sensing session to the MLME of the first device in the third MLME SAP interface primitive, the MLME may execute the corresponding a teardown process of a sensing session according to the type of the target sensing session.

The following illustrates the specific implementation of a teardown process of a target sensing session combined with the types of target sensing session.

Embodiment 1: the type of the target sensing session is a non-pairwise negotiation type.

For example, the type is an Opportunistic type, a Mono-static radar type or a Passive type.

In this situation, the MLME of the first device notifies the MAC sublayer of the first device to release the target resource corresponding to the target sensing session. For example, storage resources allocated for the target sensing session or resources for measurements are released.

Embodiment 2: the type of the target sensing session is a pairwise negotiation type.

In this situation, the MLME of the first device notifies the MAC sublayer of the first device to release the target resource corresponding to the target sensing session, and/or the MLME of the first device transmits a second request frame to the second device, where the second device is the peer device of the sensing session. For example, when the first device is the sensing initiator, the second device may be the sensing responder, and when the first device is the sensing responder, the second device may be the sensing initiator.

In some embodiments, the second request frame includes a session ID and/or a measurement setup ID. The session ID may refer to a session ID corresponding to a to-be-torn down sensing session, and the measurement setup ID may refer to a measurement setup ID corresponding to a to-be-torn down measurement setup.

The resource release manner of the first device will be described in detail in connection with a specific scenario as follows.

Situation 1: the target sensing session corresponds to one measurement setup, or the stage of session setup of the target sensing session only includes one interaction flow of measurement setup frames. There is only one sensing session between the first device and the second device.

The second request frame carries a measurement setup ID, or a session ID. The measurement setup ID may be a measurement setup ID corresponding to the one measurement setup ID in the target sensing session, and the session ID is a session ID of the target sensing session.

In the situation 1, there is a one-to-one correspondence between the measurement setup ID and the session ID, or the measurement setup ID is same as the session ID.

In the situation 1, the target resource to be released may include resources corresponding to the one sensing session between the first device and the second device, for example, storage resources allocated for the sensing session, and resources for measurements.

That is, if there is only one sensing session between the first device and the second device, and the one sensing session includes only one measurement setup, when the first device tears down the one sensing session, all resources allocated for the sensing session may be released.

Optionally, in the situation 1, the Dialog Token field in the third MLME-SAP interface primitive may also be used to indicate a measurement setup ID.

Situation 2: the target sensing session corresponds to a plurality of measurement setups, or the stage of session setup of the target sensing session includes a plurality of interaction flows of measurement setup frames. There is only one sensing session between the first device and the second device.

Situation 2-1: the second request frame carries a session ID. The session ID may be a session ID corresponding to the one sensing session between the first device and the second device.

In this situation 2-1, the target resource to be released may include a resource allocated for the one sensing session between the first device and the second device.

That is, if there is only one sensing session between the first device and the second device, and the one sensing session includes a plurality of measurement setups, the first device tearing down the one sensing session may include tearing down all measurement setups in the one sensing session, for example, releasing all resources allocated for all measurement setups in the one sensing session.

Situation 2-2: the second request frame carries at least one measurement setup ID, without a session ID. The at least one measurement setup ID may be a measurement setup ID corresponding to the to-be-torn down measurement setup in the target sensing session.

In this situation 2-2, the target resource to be released may include a resource allocated for the measurement setup corresponding to the at least one measurement setup ID in the one sensing session between the first device and the second device.

That is, if there is only one sensing session between the first device and the second device, and the one sensing session includes a plurality of measurement setups, the first device may tear down at least one measurement setup in the one sensing session, for example, releasing resources allocated for the at least one measurement setup.

Optionally, in the situation 2, the third MLME-SAP interface primitive may not include a Dialog Token field, or a value of the Dialog Token field takes a reserved value.

Situation 3: the target sensing session corresponds to a plurality of measurement setups, or the stage of session setup of the target sensing session includes a plurality of interaction flows of measurement setup frames. There is a plurality of sensing sessions between the first device and the second device.

Situation 3-1: the second request frame carries a session ID. The session ID is a session ID corresponding to the to-be-torn down target sensing session in the plurality sensing sessions between the first device and the second device.

In this situation 3-1, the target resource to be released may include a resource allocated for the target sensing session between the first device and the second device.

That is, if there is a plurality of sensing session between the first device and the second device, the first device may tear down at least one sensing session in the plurality of sensing sessions, then all measurement setups in the at least one sensing session may be torn down, for example, all resources allocated for the at least one sensing session may be released, and the second request frame may be used to indicate the second device to release all resources allocated for the at least one sensing session.

Situation 3-2: the second request frame carries the session ID and the measurement setup ID. The session ID is a session ID corresponding to the to-be-torn down target sensing session in the plurality of sensing sessions between the first device and the second device, the measurement setup ID is a measurement setup ID corresponding to the to-be-torn down measurement setup in the target sensing session.

It should be understood that the embodiments of the present disclosure is not limited to the number of session ID, the number of measurement setup ID included in the second request frame, i.e. the once teardown process of sensing session in the embodiments of the present disclosure may include a teardown of one sensing session, or may include a teardown of a plurality of sensing sessions, or may include a teardown of one measurement setup, or may include a teardown of a plurality of measurement setups.

In this situation 3-2, the target resource to be released may include the resource allocated for the to-be-torn down measurement setup in the to-be-torn down target sensing session in the plurality of sensing sessions between the first device and the second device.

That is, if there is a plurality of sensing sessions between the first device and the second device, and each sensing session includes a plurality of measurement setups, the first device may tear down at least one measurement setup in the at least one sensing session, for example, releasing resources allocated for the at least one measurement setup in the at least one sensing session.

It should be understood that in the embodiments of the present disclosure, an interaction flow of measurement setup frames may refer to an interaction flow between a measurement setup request frame and a measurement setup response frame, and once interaction flow of measurement setup frames may be used to set up one measurement setup.

Optionally, when a session setup stage of a sensing session includes a plurality of interaction flows of measurement setup frames, releasing one sensing session may include a plurality of interaction flows of measurement teardown frames.

After having received the second request frame, the second device may release the target resource corresponding to the target sensing session according to the second request frame.

In some embodiments, the method 400 further includes the following operation.

After the second device has received the second request frame, the MLME of the second device notifies the MAC sublayer of the second device to release the target resource corresponding to the target sensing session, and/or transmits a fourth indication information to the SME of the second device, where the fourth indication information is used to indicate that the second device has received the second request frame from the first device.

In some embodiments, the fourth indication information may also be implemented via the MLME-SAP interface primitive, which is denoted as MLME-SENSTEARDOWN.indication.

In some embodiments, MLME-SENSTEARDOWN.indication may be represented as:

```
MLME-SENSTEARDOWN.indication(
Dialog Token,
Number of Setups,
Measurement Setup ID list,
VendorSpecificInfo
).
```

Further, the MAC sublayer of the second device may release the target resource corresponding to the target sensing session according to the second request frame.

The resource release manner of the second device will be described in detail in connection with a specific scenario as follows.

Situation 1: the target sensing session corresponds to one measurement setup, or the stage of session setup of the target sensing session only includes one interaction flow of measurement setup frames. There is only one sensing session between the first device and the second device.

The second request frame carries a measurement setup ID, or a session ID. The measurement setup ID may be a measurement setup ID corresponding to the one measurement setup ID in the target sensing session, and the session ID is a session ID of the target sensing session.

In the situation 1, the target resource to be released may include resources corresponding to the one sensing session between the first device and the second device, for example, storage resources allocated for the sensing session, and resources for measurements.

That is, if there is only one sensing session between the first device and the second device, and the one sensing session includes only one measurement setup, the second device may release all resources allocated for the sensing session according to the second request frame.

Situation 2: the target sensing session corresponds to a plurality of measurement setups, or the stage of session setup of the target sensing session includes a plurality of interaction flows of measurement setup frames. There is only one sensing session between the first device and the second device.

Situation 2-1: the second request frame carries a session ID. The session ID may be a session ID corresponding to the one sensing session between the first device and the second device.

In this situation 2-1, the target resource to be released may include a resource allocated for the one sensing session between the first device and the second device.

That is, if there is only one sensing session between the first device and the second device, and the one sensing session includes a plurality of measurement setups, the second device may tear down resources allocated for the one sensing session according to the second request frame.

Situation 2-2: the second request frame carries at least one measurement setup ID, without a session ID. The at least one measurement setup ID may be a measurement setup ID corresponding to the to-be-torn down target measurement setup in the target sensing session.

In this situation 2-2, the target resource to be released may include a resource allocated for the measurement setup corresponding to the at least one measurement setup ID in the one sensing session between the first device and the second device.

That is, if there is only one sensing session between the first device and the second device, and the one sensing session includes a plurality of measurement setups, the second device may tear down at least one measurement setup in the one sensing session according to the second request frame, for example, releasing resources allocated for the at least one measurement setup.

Situation 3: the target sensing session corresponds to a plurality of measurement setups, or the stage of session setup of the target sensing session includes a plurality of interaction flows of measurement setup frames. There is a plurality of sensing sessions between the first device and the second device.

Situation 3-1: the second request frame carries a session ID. The session ID is a session ID corresponding to the to-be-torn down target sensing session in the plurality sensing sessions between the first device and the second device.

In this situation 3-1, the target resource to be released may include a resource allocated for the target sensing session between the first device and the second device.

That is, if there is a plurality of sensing session between the first device and the second device, the second device may tear down the target sensing session in the plurality of sensing sessions according to the second request frame, for example, releasing all resources allocated for the target sensing session.

Situation 3-2: the second request frame carries the session ID and the measurement setup ID. The session ID is a session ID corresponding to the to-be-torn down target sensing session in the plurality sensing sessions between the first device and the second device, the measurement setup ID is a measurement setup ID corresponding to the to-be-torn down measurement setup in the target sensing session.

In this situation 3-2, the target resource to be released may include the resource allocated for the to-be-torn down measurement setup in the to-be-torn down target sensing session in the plurality of sensing sessions between the first device and the second device.

That is, if there is a plurality of sensing sessions between the first device and the second device, and each sensing session includes a plurality of measurement setups, the second device may tear down at least one measurement setup in the sensing session according to the second request frame, for example, releasing resources allocated for the at least one measurement setup in the target sensing session.

To sum up, the first device and the second device release the target resources of sensing session in the same way, so as to ensure that the resources are effectively released when a teardown of the sensing session, so that the released resources may be used for the new sensing session to be set up and improve the utilization rate of resources.

In some embodiments of the present disclosure, the first device may also tear down the sensing session implicitly, for example, tearing down the sensing session when the number of measurements reaches a configured maximum number of repetitions, or tearing down the sensing session when a duration of the measurements reaches the configured duration, or tearing down the sensing session when a teardown time of the measurement reaches a configured teardown time. For example, all resources corresponding to the sensing session are torn down.

Correspondingly, the second device may also tear down the sensing session implicitly, for example, tearing down the sensing session when the number of measurements reaches the configured maximum number of repetitions, or tearing down the sensing session when the duration of the measurements reaches the configured duration, or tearing down the sensing session when the teardown time of the measurement reaches the configured teardown time. For example, all resources corresponding to the sensing session are torn down.

Figure 10:
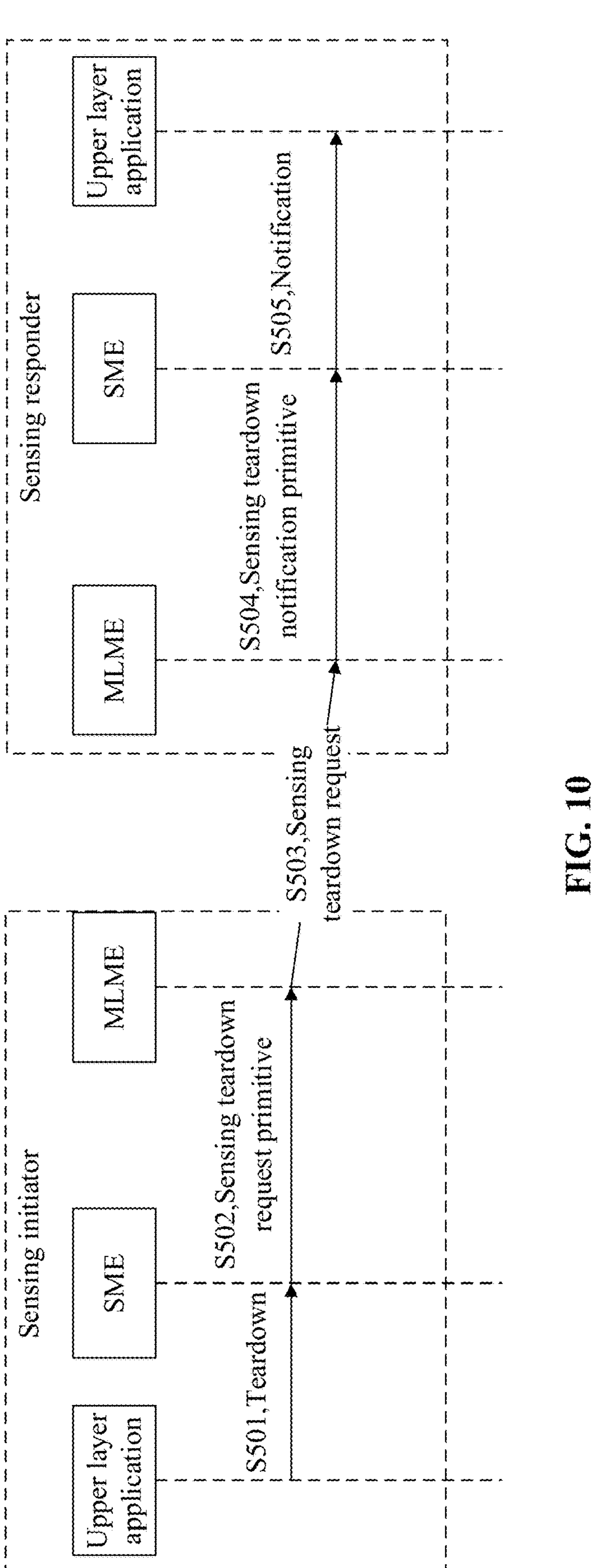
FIG. 10 is a schematic interaction diagram of a method for tearing down a sensing session according to an embodiment of the present disclosure.
Figure 11:
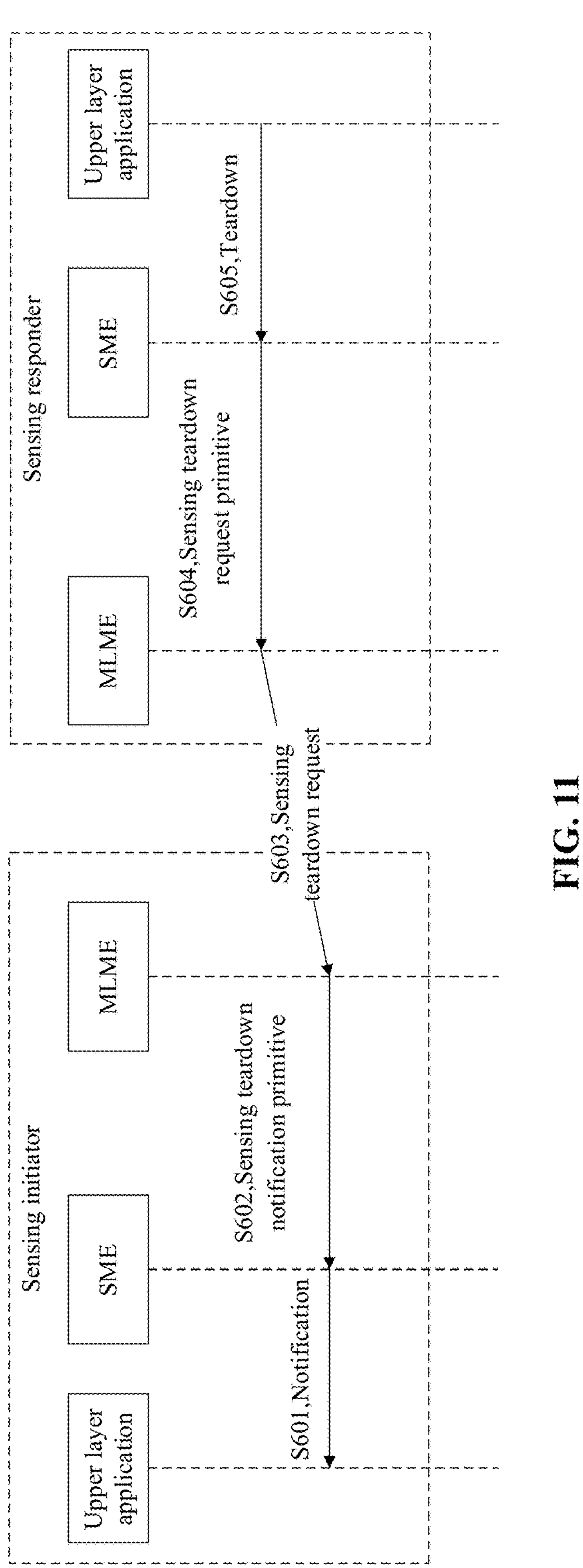
FIG. 11 is a schematic interaction diagram of another method for tearing down a sensing session according to an embodiment of the present disclosure.

With reference to FIG. 10 and FIG. 11, the overall teardown process of a sensing session according to the embodiments of the present disclosure will be explained.

It should be understood that the implementation details in the respective operations illustrated in FIG. 10 and FIG. 11 refer to the specific description of the previous embodiments and are not repeated here for the sake of brevity. FIG. 10 is a schematic interaction diagram of a teardown process of the sensing session initiated by a sensing initiator, and FIG. 11 is a schematic interaction diagram of the teardown process of the sensing session initiated by a sensing responder.

As illustrated in FIG. 10, the method 300 may include the following operations.

At S501, when the upper layer application of the sensing initiator confirms the teardown of the target sensing session, the interface of the SME of the sensing initiator is called to indicate the teardown of the sensing session to the SME.

At S502, the SME of the sensing initiator calls the sensing teardown request primitive to indicate the MLME of the sensing initiator to execute a teardown process of the target sensing session according to the type of the to-be-torn down target sensing session.

In some embodiments, if the target sensing session is of a non-pairwise negotiation type, the MLME of the sensing initiator notifies the MAC sublayer of the sensing initiator to release the target resource corresponding to the target sensing session. For example, all resources allocated for the target sensing session (such as storage resources) or resources for measurements, are released.

In another embodiment, if the target sensing session is of a pairwise negotiation type, the MLME of the sensing initiator notifies the MAC sublayer of the sensing initiator to release the target resource corresponding to the target sensing session, and/or the MLME of the sensing initiator transmits to the sensing responder a measurement teardown request frame.

At S503, the MLME of the sensing initiator transmits a measurement teardown request frame to the MLME of the sensing responder.

At S504, after receiving the measurement teardown request frame, the MLME of the sensing responder notifies the SME of the sensing response device that the sensing responder has received the measurement teardown request frame from the sensing initiator through the sensing teardown notification primitive.

At S505, the SME of the sensing responder notifies the upper application of the sensing responder.

As illustrated in FIG. 11, the method 300 may include the following operations.

At S601, when the upper layer application of the sensing responder confirms the teardown of the target sensing session, the interface of the SME of the sensing responder is called to indicate the teardown of the sensing session to the SME.

At S602, the SME of the sensing responder calls the sensing teardown request primitive to indicate the MLME of the sensing responder to execute a teardown process of the target sensing session according to the type of the to-be-torn down target sensing session.

In some embodiments, if the target sensing session is of a non-pairwise negotiation type, the MLME of the sensing responder notifies the MAC sublayer of the sensing responder to release the target resource corresponding to the target sensing session. For example, all resources allocated for the target sensing session (such as storage resources) or resources for measurements, are released.

In another embodiment, if the target sensing session is of a pairwise negotiation type, the MLME of the sensing responder notifies the MAC sublayer of the sensing responder to release the target resource corresponding to the target sensing session, and/or the MLME of the sensing responder transmits to the sensing initiator a measurement teardown request frame.

At S603, the MLME of the sensing responder transmits a measurement teardown request frame to the MLME of the sensing initiator.

At S604, after receiving the measurement teardown request frame, the MLME of the sensing initiator notifies the SME of the sensing initiator that the sensing initiator has received the measurement teardown request frame from the sensing responder through the sensing teardown notification primitive.

At S605, the SME of the sensing initiator notifies the upper application of the sensing initiator.

The frame format design of the second request frame is described below.

Figure 12:
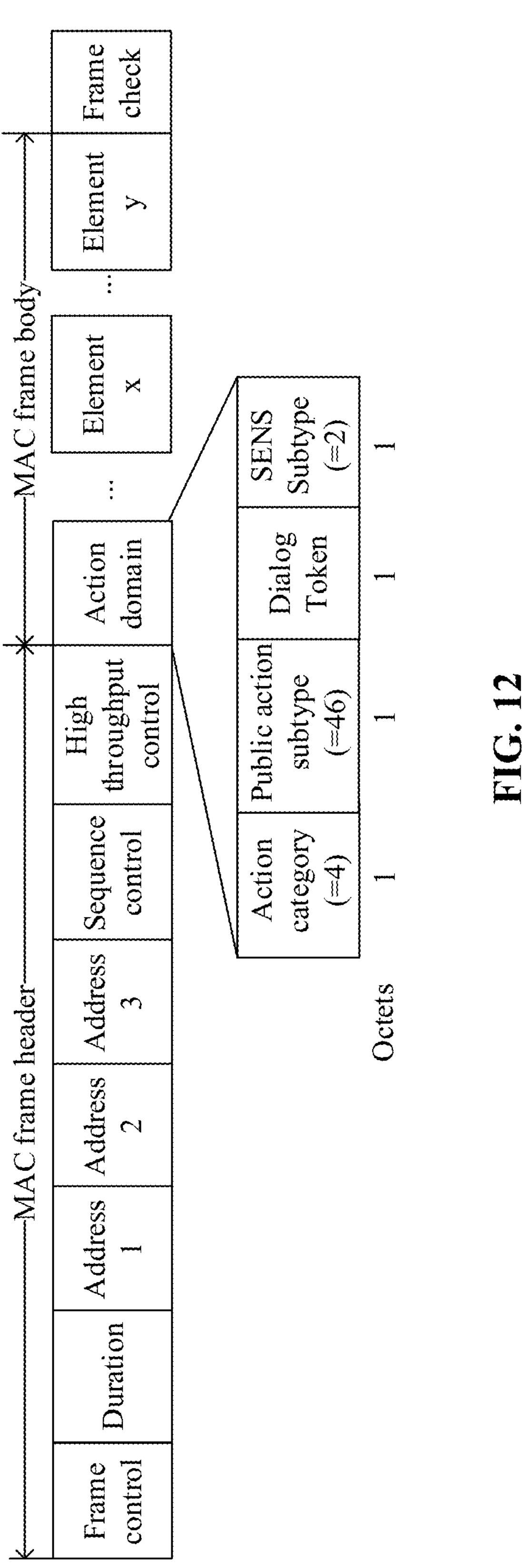
FIG. 12 is a schematic diagram of a frame format of a measurement teardown request frame according to an embodiment of the present disclosure.
Figure 13:
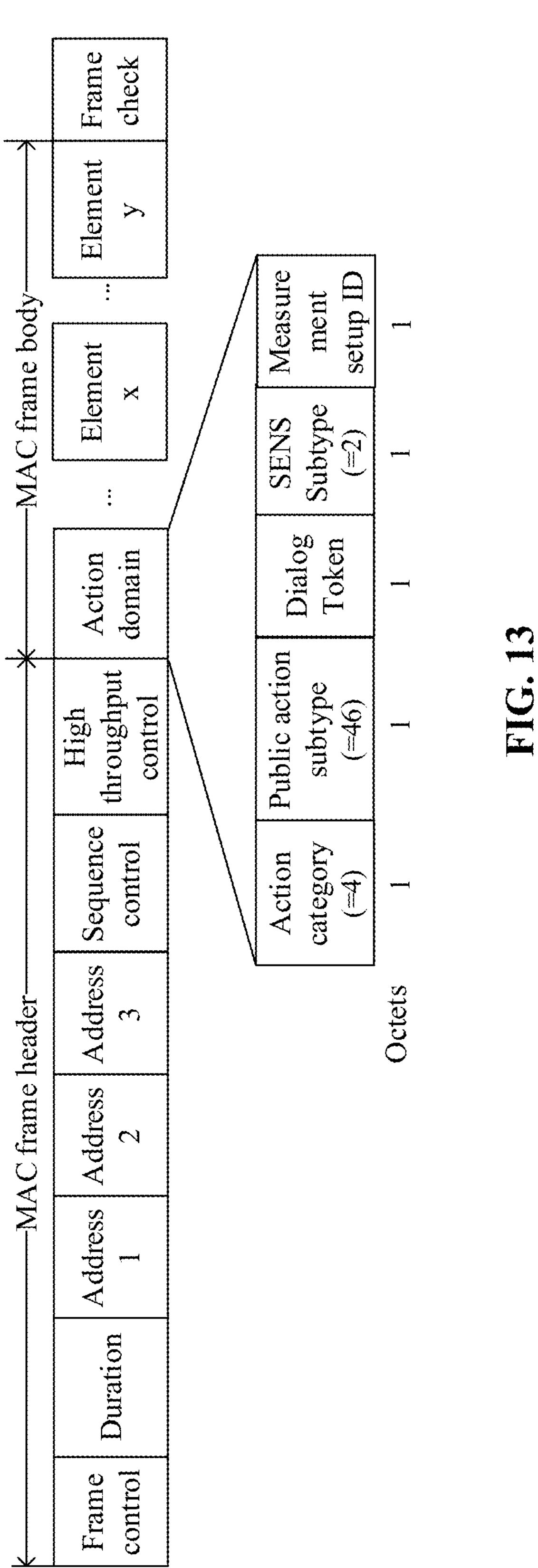
FIG. 13 is a schematic diagram of a frame format of a measurement teardown request frame according to another embodiment of the present disclosure.
Figure 14:
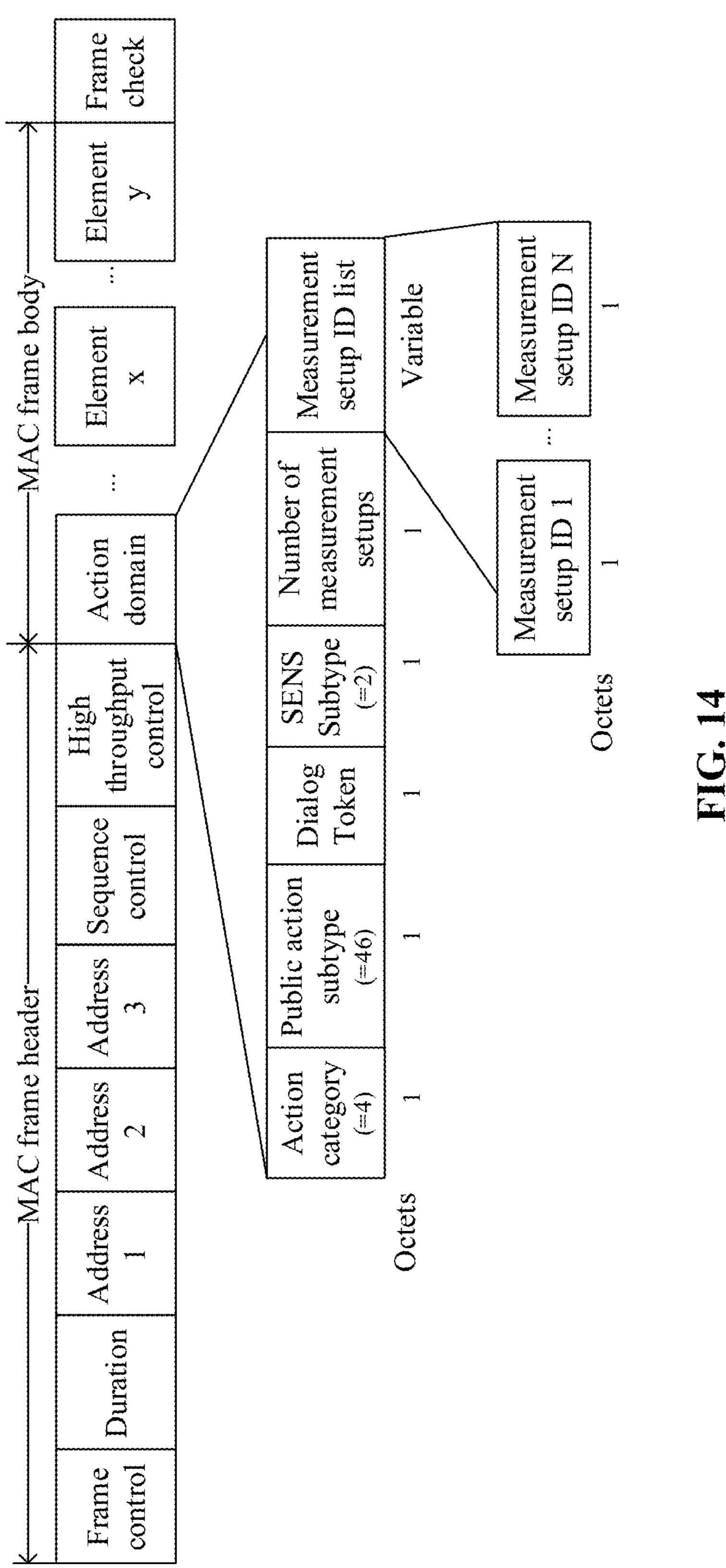
FIG. 14 is a schematic diagram of a frame format of a measurement teardown request frame according to yet another embodiment of the present disclosure.

It should be understood that the frame format of the second request frame illustrated in FIG. 12 to FIG. 14 is only an example, and other frame formats obtained by transforming the frame format according to the example of the present disclosure fall within the scope of protection of the present disclosure, and the present disclosure is not limited thereto.

In some embodiments, the second request frame is implemented via an Action frame or an action no acknowledge frame (Action No Ack frame). That is, a measurement teardown request frame may be achieved through the Action frame or the Action No Ack frame.

In some embodiments, at least one field in the Action frame or Action No Ack frame may be utilized to indicate that the Action frame is a measurement teardown request frame.

In some embodiments, the Action frame or Action No Ack frame includes an action field, the action field includes an action category field, a public action subtype field, and a sensing subtype (SENS Subtype), and the Action frame or Action No Ack frame may be indicated as a measurement teardown request frame jointly by values of the action category field, the public action subtype field and the sensing subtype field.

As an example, a value of the action category field of 4 indicates that the frame is a public action frame, a value of the public action subtype field being a reserved value (for example, any numerical value in the range of 46~255, which is explained by taking 46 as an example below) indicates that the frame is sensing action frame, and further a value of the sensing subtype indicates that the frame is a measurement teardown request frame.

For example, the value of the sensing subtype being the third value indicates that the action frame is a measurement teardown request frame. As an example, the third value is 2.

FIG. 12 is a schematic diagram of a frame format of a measurement teardown request frame according to an embodiment of the present disclosure. In the frame format, a value of the action category field of 4 indicates that the frame is a public action frame, a value of the public action subtype field of 46 indicates that the frame is sensing action frame, and a value of the sensing subtype of 2 indicates that the frame is a measurement teardown request frame.

In some embodiments, as illustrated in FIG. 12, the measurement teardown request frame may also include at least one of the following fields:

Dialog Token field, which indicates a session ID corresponding to the to-be-torn down target sensing session.

In the situation 1, the dialog token field may also be used to indicate the measurement setup ID.

In some scenarios, the frame format of the measurement teardown request frame in FIG. 12 may be applied to the foregoing situation 1, situation 2-1 and situation 3-1 as described above.

FIG. 13 is a schematic diagram of a frame format of a measurement teardown request frame according to another embodiment of the present disclosure. In the frame format, a value of the action category field of 4 indicates that the frame is a public action frame, a value of the public action subtype field of 46 indicates that the frame is sensing action frame, and a value of the sensing subtype of 2 indicates that the frame is a measurement teardown request frame.

In some embodiments, as illustrated in FIG. 13, the measurement teardown request frame may also include at least one of the following fields:

Dialog Token field, which indicates a session ID corresponding to the to-be-torn down target sensing session.

Measurement Setup ID field, used to indicate the Measurement Setup ID corresponding to the to-be-torn down measurement setup.

In some scenarios, the frame format of the measurement setup request frame in FIG. 13 may be applied to the foregoing situations 2-2 and 3-2.

FIG. 14 is a schematic diagram of a frame format of a measurement teardown request frame according to yet another embodiment of the present disclosure. In the frame format, a value of the action category field of 4 indicates that the frame is a public action frame, a value of the public action subtype field of 46 indicates that the frame is sensing action frame, and a value of the sensing subtype of 2 indicates that the frame is a measurement teardown request frame.

In some embodiments, as illustrated in FIG. 14, the measurement teardown request frame may also include at least one of the following fields:

Dialog Token field, which indicates a session ID corresponding to the to-be-torn down target sensing session.

Number of Setups field, used to indicate the number information of the to-be-torn down measurement setup. For example, a value of 1 to 255 indicates the number of setups to be released. Optionally, a value of 0 indicates that all resources of all set up measurements are released.

Measurement Setup ID list field, used to indicate ID(s) of one or more measurement setup(s) to be released. Optionally, when a value of the Number of Setups is 0, the measurement setup ID list field does not exist.

In some scenarios, the frame format of the measurement setup request frame in FIG. 14 may be applied to the foregoing situations 2-2 and 3-2.

The method embodiments of the present disclosure have been described in detail above with reference to FIG. 3 to FIG. 14, and the apparatus embodiments of the present disclosure have been described in detail below with reference to FIG. 15 to FIG. 21. It should be understood that the apparatus embodiments and the method embodiments correspond to each other, and similar descriptions may refer to the method embodiments.

Figures 15, 16, 17, 18:
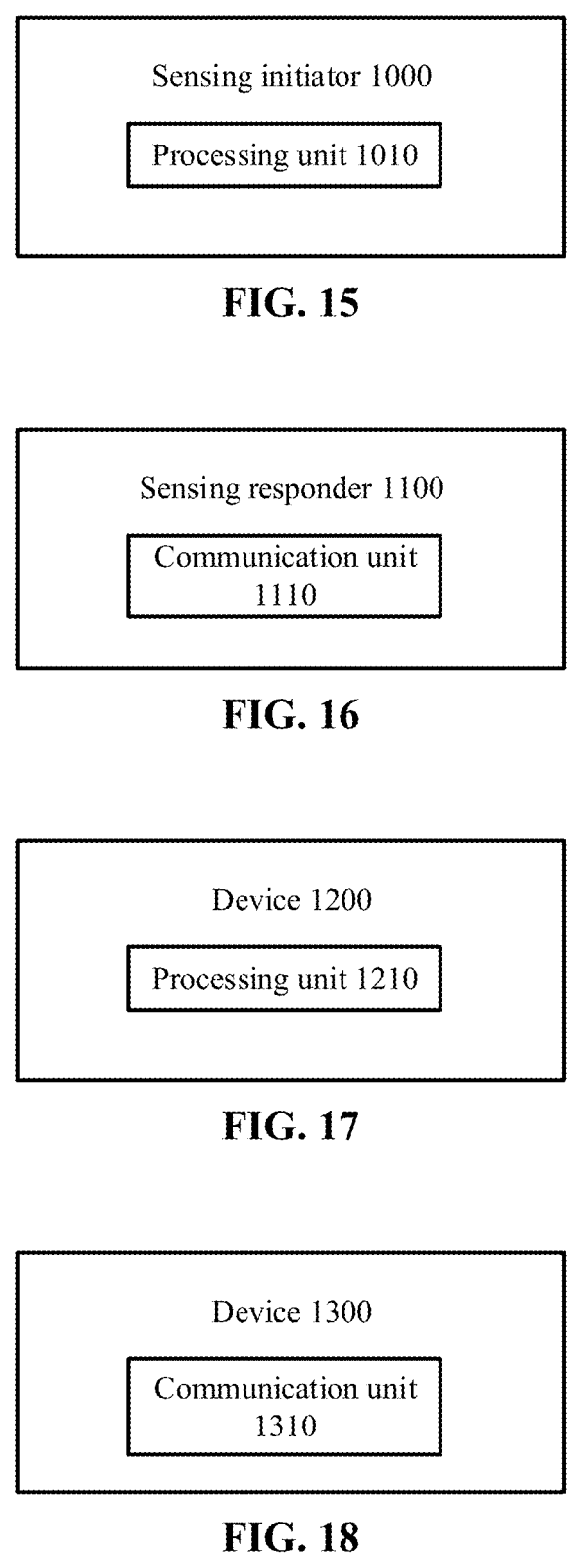

FIG. 15 illustrates a schematic block diagram of a sensing initiator 1000 according to an embodiment of the present disclosure. As illustrated in FIG. 15, the sensing initiator 1000 includes a processing unit 1010.

The processing unit 1010 is configured to perform a setup process of a target sensing session according to a type of the to-be-set up target sensing session.

In some embodiments, the processing unit 1010 is further configured to:

when the target sensing session is of a pairwise negotiation type, allocate a resource for the target sensing session, and/or transmit a first request frame to a sensing responder, where the first request frame is configured to request a measurement setup for the target sensing session; or when the target sensing session is of a non-pairwise negotiation type, allocate a resource for a sensing session with the non-pairwise negotiation type.

In some embodiments, the sensing initiator indicates a type of the target sensing session through a first media access control sublayer management entity service access point (MLME-SAP) interface primitive.

In some embodiments, a station management entity (SME) of the sensing initiator calls the first MLME-SAP interface primitive, so that a media access control sublayer management entity (MLME) of the sensing initiator performs the setup process of the target sensing session according to the type of the target sensing session.

In some embodiments, the first MLME-SAP interface primitive is configured to indicate at least one of:

the type of the target sensing session, a session identification of the target sensing session, a measurement setup identification, a duration of a measurement, a number of repetitions of the measurement, an interval time of the measurement, or a sensing request parameter, where the sensing request parameter includes an identity identification of a sensing responder.

In some embodiments, when the first MLME-SAP interface primitive indicates that the type of the target sensing session is a non-pairwise negotiation type, the MLME of the sensing initiator notifies a media access control (MAC) sublayer of the sensing initiator to allocate a resource for the target sensing session with the non-pairwise negotiation type, and/or the MLME of the sensing initiator transmits first indication information to the SME of the sensing initiator, where the first indication information is configured to indicate a setup result of the target sensing session with the non-pairwise negotiation type.

In some embodiments, when the first MLME-SAP interface primitive indicates that the type of the target sensing session is a pairwise negotiation type, the MLME of the sensing initiator notifies an MAC sublayer of the sensing initiator to allocate a resource for the target sensing session with the pairwise negotiation type and/or the MLME of the sensing initiator transmits a first request frame to a sensing responder, where the first request frame is configured to request a measurement setup for the target sensing session.

In some embodiments, the first request frame includes a measurement setup identification and/or a session identification.

In some embodiments, the target sensing session corresponds to one measurement setup, and the first request frame includes a measurement setup identification corresponding to the one measurement setup or a session identification corresponding to the target sensing session.

In some embodiments, there is an one-to-one correspondence between the measurement setup identification corresponding to the one measurement setup and the session identification corresponding to the target sensing session, or the measurement setup identification corresponding to the one measurement setup is same as the session identification corresponding to the target sensing session.

In some embodiments, the target sensing session corresponds to a plurality of measurement setups, there is one sensing session between the sensing initiator and the sensing responder, and the first request frame includes a measurement setup identification corresponding to a to-be-set up measurement setup.

In some embodiments, the target sensing session corresponds to a plurality of measurement setups, there are a plurality of sensing sessions between the sensing initiator and the sensing responder, and the first request frame includes a session identification corresponding to the target sensing session and a measurement setup identification corresponding to a to-be-set up measurement setup.

In some embodiments, the target sensing session is a sensing session having been set up between the sensing initiator and the sensing responder, and the to-be-set up measurement setup is a new measurement setup in the sensing session having been set up; or the target sensing session is a new sensing session to be set up between the sensing initiator and the sensing responder, and the to-be-set up measurement setup is a new measurement setup in the new sensing session to be set up.

In some embodiments, the device further includes a communication unit.

The communication unit is configured to receive a first response frame from a sensing responder, the first response frame being configured to indicate response information for a measurement setup.

In some embodiments, the first response frame includes a measurement setup identification and/or a session identification.

In some embodiments, the target sensing session corresponds to one measurement setup, and the first response frame includes a measurement setup identification corresponding to the one measurement setup or a session identification corresponding to the target sensing session.

In some embodiments, the target sensing session corresponds to a plurality of measurement setups, there is one sensing session between the sensing initiator and the sensing responder, and the first response frame includes a measurement setup identification corresponding to a to-be-set up measurement setup.

In some embodiments, the target sensing session corresponds to a plurality of measurement setups, there are a plurality of sensing sessions between the sensing initiator and the sensing responder, and the first response frame includes a session identification corresponding to the target sensing session and a measurement setup identification corresponding to a to-be-set up measurement setup.

In some embodiments, the target sensing session is a sensing session having been set up between the sensing initiator and the sensing responder, and the to-be-set up measurement setup is a new measurement setup in the sensing session having been set up; or the target sensing session is a new sensing session to be set up between the sensing initiator and the sensing responder, and the to-be-set up measurement setup is a new measurement setup in the new sensing session to be set up.

In some embodiments, an MLME of the sensing initiator transmits second indication information to an SME of the sensing initiator, the second indication information being configured to indicate that the sensing initiator has received the first response frame from the sensing responder.

In some embodiments, the first request frame is an action frame or an action no acknowledgement frame.

In some embodiments, the first request frame includes an action field, the action field includes an action category field, a public action subtype field and a sensing subtype field, and the first request frame is indicated as a measurement setup request frame jointly by values of the action category field, the public action subtype field and the sensing subtype field.

In some embodiments, the first request frame includes a dialog token field and/or a measurement setup identification field, the dialog token field being configured to indicate a session identification, and the measurement setup identification field being configured to indicate a measurement setup identification corresponding to a to-be-set up measurement setup.

In some embodiments, the first response frame is an action frame or an action no acknowledgement frame.

In some embodiments, the first response frame includes an action field, the action field includes an action category field, a public action subtype field and a sensing subtype field, and the first response frame is indicated as a measurement setup response frame jointly by values of the action category field, the public action subtype field and the sensing subtype field.

In some embodiments, the first response frame includes a dialog token field and/or a measurement setup identification field, the dialog token field being configured to indicate a session identification, and the measurement setup identification field being configured to indicate a measurement setup identification corresponding to a to-be-set up measurement setup.

Optionally, in some embodiments, the communication unit may be a communication interface or transceiver or an input-output interface of a communication chip or a system-on-chip. The processing unit may be one or more processors.

It should be understood that the sensing initiator 1000 according to the embodiment of the present disclosure may correspond to the sensing initiator in the method embodiment of the present disclosure, and the above and other operations and/or functions of the individual units in the sensing initiator 1000 are designed to implement the respective flow of the sensing initiator in the method 200 illustrated in FIG. 3-FIG. 8, respectively, which will not be repeated here for the sake of brevity.

FIG. 16 illustrates a schematic block diagram of a sensing responder 1100 according to an embodiment of the present disclosure. As illustrated in FIG. 16, the sensing responder 1100 includes a communication unit 1110.

The communication unit 1110 is configured to receive a first request frame from a sensing initiator, the first request frame being configured to request a measurement setup, and the measurement setup corresponding to a target sensing session with a pairwise negotiation type.

In some embodiments, the first request frame includes a measurement setup identification and/or a session identification.

In some embodiments, the target sensing session corresponds to one measurement setup, and the first request frame includes a measurement setup identification corresponding to the one measurement setup or a session identification corresponding to the target sensing session.

In some embodiments, there is an one-to-one correspondence between the measurement setup identification corresponding to the one measurement setup and the session identification corresponding to the target sensing session, or the measurement setup identification corresponding to the one measurement setup is same as the session identification corresponding to the target sensing session.

In some embodiments, the target sensing session corresponds to a plurality of measurement setups, there is one sensing session between the sensing initiator and the sensing responder, and the first request frame includes a measurement setup identification corresponding to a to-be-set up measurement setup.

In some embodiments, the target sensing session corresponds to a plurality of measurement setups, there are a plurality of sensing sessions between the sensing initiator and the sensing responder, and the first request frame includes a session identification corresponding to the target sensing session and a measurement setup identification corresponding to a to-be-set up measurement setup.

In some embodiments, the target sensing session is a sensing session having been set up between the sensing initiator and the sensing responder, and the to-be-set up measurement setup is a new measurement setup in the sensing session having been set up; or the target sensing session is a new sensing session to be set up between the sensing initiator and the sensing responder, and the to-be-set up measurement setup is a new measurement setup in the new sensing session to be set up.

In some embodiments, a media access control sublayer management entity (MLME) of the sensing responder transmits third indication information to a station management entity (SME) of the sensing responder, the third indication information being configured to indicate that the sensing responder has received the first request frame from the sensing initiator.

In some embodiments, an SME of the sensing responder calls a second media access control sublayer management entity service access point (MLME-SAP) interface primitive, so that an MLME of the sensing responder notifies a media access control (MAC) sublayer of the sensing responder to allocate a resource for the target sensing session and/or transmits a first response frame to the sensing initiator.

In some embodiments, the second MLME-SAP interface primitive is configured to indicate at least one of:

a session identification of the target sensing session, a measurement setup identification, feedback information for the measurement setup by the sensing responder, or a sensing response set, where the sensing response set is configured to indicate a parameter determined by the sensing responder for setting up a sensing session.

In some embodiments, the communication unit 1110 is further configured to:

The communication unit is configured to transmit a first response frame to the sensing initiator, the first response frame being configured to indicate response information for a measurement setup.

In some embodiments, the first response frame includes a measurement setup identification and/or a session identification.

In some embodiments, the target sensing session corresponds to one measurement setup, and the first response frame includes a measurement setup identification corresponding to the one measurement setup or a session identification corresponding to the target sensing session.

In some embodiments, there is an one-to-one correspondence between the measurement setup identification corresponding to the one measurement setup and the session identification corresponding to the target sensing session, or the measurement setup identification corresponding to the one measurement setup is same as the session identification corresponding to the target sensing session.

In some embodiments, the target sensing session corresponds to a plurality of measurement setups, there is one sensing session between the sensing initiator and the sensing responder, and the first response frame includes a measurement setup identification corresponding to a to-be-set up measurement setup.

In some embodiments, the target sensing session corresponds to a plurality of measurement setups, there are a plurality of sensing sessions between the sensing initiator and the sensing responder, and the first response frame includes a session identification corresponding to the target sensing session and a measurement setup identification corresponding to a to-be-set up measurement setup.

In some embodiments, the target sensing session is a sensing session having been set up between the sensing initiator and the sensing responder, and the to-be-set up measurement setup is a new measurement setup in the sensing session having been set up; or the target sensing session is a new sensing session to be set up between the sensing initiator and the sensing responder, and the to-be-set up measurement setup is a new measurement setup in the new sensing session to be set up.

In some embodiments, the first request frame is an action frame or an action no acknowledgement frame.

In some embodiments, the first request frame includes an action field, the action field includes an action category field, a public action subtype field and a sensing subtype field, and the first request frame is indicated as a measurement setup request frame jointly by values of the action category field, the public action subtype field and the sensing subtype field.

In some embodiments, the first request frame includes a dialog token field and/or a measurement setup identification field, the dialog token field being configured to indicate a session identification, and the measurement setup identification field being configured to indicate a measurement setup identification corresponding to a to-be-set up measurement setup.

In some embodiments, the first response frame is an action frame or an action no acknowledgement frame.

In some embodiments, the first response frame includes an action field, the action field includes an action category field, a public action subtype field and a sensing subtype field, and the first response frame is indicated as a measurement setup response frame jointly by values of the action category field, the public action subtype field and the sensing subtype field.

Optionally, in some embodiments, the communication unit may be a communication interface or transceiver or an input-output interface of a communication chip or a system-on-chip. The processing unit may be one or more processors.

It should be understood that the sensing responder 1100 according to the embodiment of the present disclosure may correspond to the sensing responder in the method embodiment of the present disclosure, and the above and other operations and/or functions of the individual units in the sensing responder 1100 are designed to implement the respective flow of the sensing responder in the method 200 illustrated in FIG. 3-FIG. 8, respectively, which will not be repeated here for the sake of brevity.

FIG. 17 illustrates a schematic block diagram of a device 1200 for wireless communication according to an embodiment of the present disclosure. As illustrated in FIG. 17, the device 1200 includes a processing unit 1210.

The processing unit 1210 is configured to perform a teardown process of a target sensing session according to a type of the to-be-torn down target sensing session, where the device is a sensing initiator or a sensing responder.

In some embodiments, the processing unit 1210 is further configured to:

when the target sensing session is of a non-pairwise negotiation type, release a target resource corresponding to the target sensing session; or when the target sensing session is of a pairwise negotiation type, release the target resource corresponding to the target sensing session, and/or control the communication unit to transmit a second request frame to a second device, where the second request frame is configured to request a release of the target resource corresponding to the target sensing session, and the second device is a sensing responder or a sensing initiator.

In some embodiments, the processing unit 1210 is further configured to:

indicate a teardown of the target sensing session through a third media access control sublayer management entity service access point (MLME-SAP) interface primitive.

In some embodiments, a station management entity (SME) of the device calls the third MLME-SAP interface primitive, so that a media access control sublayer management entity (MLME) performs the teardown process of the target sensing session according to a type of the target sensing session.

In some embodiments, the third MLME-SAP interface primitive is configured to indicate at least one of:

a session identification of the target sensing session, or a measurement setup identification list corresponding to a to-be-torn down measurement setup.

In some embodiments, when the target sensing session is of a non-pairwise negotiation type, the MLME notifies a media access control (MAC) sublayer of the device to release a target resource corresponding to the target sensing session with the non-pairwise negotiation type.

In some embodiments, when the target sensing session is of a pairwise negotiation type, the MLME of the device notifies an MAC sublayer of the device to release a target resource corresponding to the target sensing session with the pairwise negotiation type and/or the MLME of the device transmits a second request frame to the second device, where the second request frame is configured to request a release of the target resource corresponding to the target sensing session, and the second device is a sensing responder or a sensing initiator.

In some embodiments, the second request frame includes at least one measurement setup identification and/or at least one session identification, and the target resource corresponding to the target sensing session is determined according to the at least one measurement setup identification and/or at least one session identification.

In some embodiments, the target sensing session corresponds to one measurement setup, the second request frame includes a measurement setup identification corresponding to the one measurement setup, and the target resource corresponding to the target sensing session includes all resources allocated for the one measurement setup.

In some embodiments, the target sensing session corresponds to a plurality of measurement setups, there is one sensing session between the sensing initiator and the sensing responder, the second request frame includes a session identification corresponding to the one sensing session without a measurement setup identification, and the target resource corresponding to the target sensing session includes all resources allocated for the one sensing session.

In some embodiments, the target sensing session corresponds to a plurality of measurement setups, there is one sensing session between the sensing initiator and the sensing responder, the second request frame includes at least one measurement setup identification, and the target resource corresponding to the target sensing session includes a resource allocated for a measurement setup corresponding to the at least one measurement setup identification in the one sensing session.

In some embodiments, the target sensing session corresponds to a plurality of measurement setups, there are a plurality of sensing sessions between the sensing initiator and the sensing responder, the second request frame includes at least one session identification, and the target resource corresponding to the target sensing session includes all resources allocated for a sensing session corresponding to the at least one session identification.

In some embodiments, the target sensing session corresponds to a plurality of measurement setups, there are a plurality of sensing sessions between the sensing initiator and the sensing responder, the second request frame includes at least one session identification and at least one measurement setup identification, and the target resource corresponding to the target sensing session includes a resource allocated for a measurement setup corresponding to the at least one measurement identification in a sensing session corresponding to the at least one session identification.

In some embodiments, the second request frame is an action frame or an action no acknowledgement frame.

In some embodiments, the second request frame includes an action field, the action field includes an action category field, a public action subtype field and a sensing subtype field, and the second request frame is indicated as a sensing teardown request frame jointly by values of the action category field, the public action subtype field and the sensing subtype field.

In some embodiments, the second request frame includes a dialog token field and/or at least one measurement setup identification field, the dialog token field being configured to indicate a session identification corresponding to a to-be-torn down sensing session, and the measurement setup identification field being configured to indicate a measurement setup identification corresponding to a to-be-torn down measurement setup.

Optionally, in some embodiments, the communication unit may be a communication interface or transceiver or an input-output interface of a communication chip or a system-on-chip. The processing unit may be one or more processors.

It should be understood that the device 1200 according to the embodiment of the present disclosure may correspond to the first device in the method embodiment of the present disclosure, and the above and other operations and/or functions of the individual units in the device 1200 are designed to implement the respective flow of the first device in the method 200 illustrated in FIG. 9-FIG. 14, respectively, which will not be repeated here for the sake of brevity.

FIG. 18 illustrates a schematic block diagram of a device 1300 for wireless communication according to an embodiment of the present disclosure. As illustrated in FIG. 18, the device 1300 includes a communication unit 1310.

The communication unit 1310 is configured to receive a second request frame from a first device, where the second request frame is configured to request a release of a target resource corresponding to a target sensing session, and the target sensing session is of a pairwise negotiation type;

where the first device is a sensing initiator, and the device is a sensing responder; or the first device is a sensing responder, and the device is a sensing initiator.

In some embodiments, the device further includes a processing unit.

The processing unit is configured to release the target resource corresponding to the target sensing session according to the second request frame.

In some embodiments, a media access control sublayer management entity (MLME) of the device notifies a media access control (MAC) sublayer to release the target resource corresponding to the target sensing session, and/or the MLME of the device transmits a fourth indication information to a station management entity (SME), where the fourth indication information is configured to indicate that the device has received the second request frame from the first device.

In some embodiments, the second request frame includes at least one measurement setup identification and/or at least one session identification, and the target resource corresponding to the target sensing session is determined according to the at least one measurement setup identification and/or at least one session identification.

In some embodiments, the target sensing session corresponds to one measurement setup, the second request frame includes a measurement setup identification corresponding to the one measurement setup, and the target resource corresponding to the target sensing session includes all resources allocated for the one measurement setup.

In some embodiments, the target sensing session corresponds to a plurality of measurement setups, there is one sensing session between the sensing initiator and the sensing responder, the second request frame includes a session identification corresponding to the one sensing session without a measurement setup identification, and the target resource corresponding to the target sensing session includes all resources allocated for the one sensing session.

In some embodiments, the target sensing session corresponds to a plurality of measurement setups, there is one sensing session between the sensing initiator and the sensing responder, the second request frame includes at least one measurement setup identification, and the target resource corresponding to the target sensing session includes a resource allocated for a measurement setup corresponding to the at least one measurement setup identification in the one sensing session.

In some embodiments, the target sensing session corresponds to a plurality of measurement setups, there are a plurality of sensing sessions between the sensing initiator and the sensing responder, the second request frame includes at least one session identification, and the target resource corresponding to the target sensing session includes all resources allocated for a sensing session corresponding to the at least one session identification.

In some embodiments, the target sensing session corresponds to a plurality of measurement setups, there are a plurality of sensing sessions between the sensing initiator and the sensing responder, the second request frame includes at least one session identification and at least one measurement setup identification, and the target resource corresponding to the target sensing session includes a resource allocated for a measurement setup corresponding to the at least one measurement identification in a sensing session corresponding to the at least one session identification.

In some embodiments, the second request frame is an action frame or an action no acknowledgement frame.

In some embodiments, the second request frame includes an action field, the action field includes an action category field, a public action subtype field and a sensing subtype field, and the second request frame is indicated as a sensing teardown request frame jointly by values of the action category field, the public action subtype field and the sensing subtype field.

In some embodiments, the second request frame includes a dialog token field and/or at least one measurement setup identification field, the dialog token field being configured to indicate a session identification corresponding to a to-be-torn down sensing session, and the measurement setup identification field being configured to indicate a measurement setup identification corresponding to a to-be-torn down measurement setup.

Optionally, in some embodiments, the communication unit may be a communication interface or transceiver or an input-output interface of a communication chip or a system-on-chip. The processing unit may be one or more processors.

It should be understood that the device 1300 according to the embodiment of the present disclosure may correspond to the second device in the method embodiment of the present disclosure, and the above and other operations and/or functions of the individual units in the device 1300 are designed to implement the respective flow of the second device in the method 200 illustrated in FIG. 9-FIG. 14, respectively, which will not be repeated here for the sake of brevity.

Figure 19:
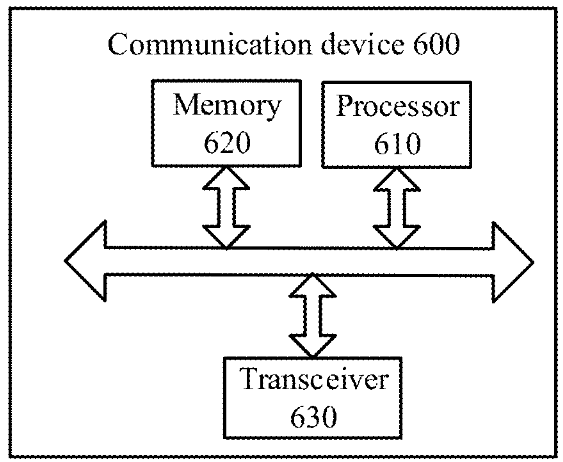
FIG. 19 is a schematic block diagram of a communication device provided by an embodiment of the present disclosure.

FIG. 19 is a schematic structural diagram of a communication device 600 provided by an embodiment of the present disclosure. A communication device 600 illustrated in FIG. 19 includes a processor 610 that can call and execute a computer program in a memory to implement the method in embodiments of the present disclosure.

Optionally, as illustrated in FIG. 19, the communication device 600 may also include a memory 620. The processor 610 may call and execute a computer program from memory 620 to implement the method in the embodiments of the present disclosure.

The memory 620 may be a separate device independent of the processor 610 or may be integrated in the processor 610.

As illustrated in FIG. 6, the communication device 600 may also include a transceiver 630. The processor 610 may control the transceiver 630 to communicate with other devices, and in particular transmit information or data to other devices, or receive information or data transmitted by other devices.

The transceiver 630 may include a transmitter and a receiver. The transceiver 630 may further include antennas. The number of antennas may be one or more.

Optionally, the communication device 600 may be specifically a sensing initiator of the embodiments of the present disclosure, and the communication device 600 may implement corresponding processes implemented by the sensing initiator in various methods of the embodiments of the present disclosure, which will not be repeated here for the sake of brevity.

Optionally, the communication device 600 may be specifically a sensing responder of the embodiments of the present disclosure, and the communication device 600 may implement corresponding processes implemented by the sensing responder in various methods of the embodiments of the present disclosure, which will not be repeated here for the sake of brevity.

Optionally, the communication device 600 may be specifically a first device of the embodiments of the present disclosure, and the communication device 600 may implement corresponding processes implemented by the first device in various methods of the embodiments of the present disclosure, which will not be repeated here for the sake of brevity.

Optionally, the communication device 600 may be specifically a second device of the embodiments of the present disclosure, and the communication device 600 may implement corresponding processes implemented by the second device in various methods of the embodiments of the present disclosure, which will not be repeated here for the sake of brevity.

Figure 20:
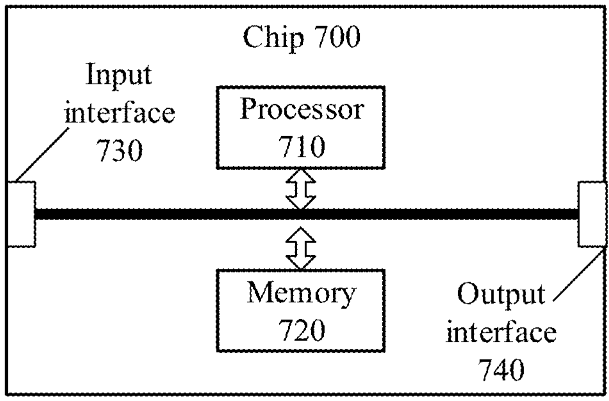
FIG. 20 is a schematic block diagram of a chip provided by an embodiment of the present disclosure.

FIG. 20 is a schematic structural diagram of a chip according to an embodiment of the present disclosure. A chip 700 illustrated in FIG. 20 includes a processor 710 that may call and execute a computer program in a memory to implement the method in the embodiments of the present disclosure.

Optionally, as illustrated in FIG. 20, the chip 700 may also include a memory 720. The processor 710 may call and execute a computer program from memory 720 to implement the method in the embodiments of the present disclosure.

The memory 720 may be a separate device independent of the processor 710 or may be integrated in the processor 710.

Optionally, the chip 700 may also include an input interface 730. The processor 710 may control the input interface 730 to communicate with other devices or chips, and in particular obtain information or data transmitted by other devices or chips.

Optionally, the chip 700 may also include an output interface 740. The processor 710 may control the output interface 740 to communicate with other devices or chips, and in particular output information or data to other devices or chips.

Optionally, the chip may be applied to be a sensing initiator of the embodiments of the present disclosure, and the chip may implement corresponding processes implemented by the sensing initiator in various methods of the embodiments of the present disclosure, which will not be repeated here for the sake of brevity.

Optionally, the chip may be applied to be a sensing responder of the embodiments of the present disclosure, and the chip may implement corresponding processes implemented by the sensing responder in various methods of the embodiments of the present disclosure, which will not be repeated here for the sake of brevity.

Optionally, the chip may be applied to be a first device of the embodiments of the present disclosure, and the chip may implement corresponding processes implemented by the first device in various methods of the embodiments of the present disclosure, which will not be repeated here for the sake of brevity.

Optionally, the chip may be applied to be a second device of the embodiments of the present disclosure, and the chip may implement corresponding processes implemented by the second device in various methods of the embodiments of the present disclosure, which will not be repeated here for the sake of brevity.

It should be understood that the chip referred to in the embodiments of the present disclosure may also be referred to as a system-level chip, a system chip, a chip system or a system-on-chip or the like.

Figure 21:
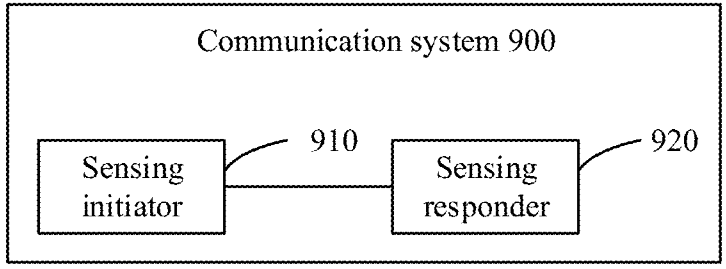
FIG. 21 is a schematic block diagram of a communication system provided by an embodiment of the present disclosure.

FIG. 21 is a schematic block diagram of a communication system 900 provided by an embodiment of the present disclosure. As illustrated in FIG. 21, the communication system 900 includes a sensing initiator 910 and a sensing responder 920.

The sensing initiator 910 may be configured to implement corresponding functions implemented by the sensing initiator in the above method, and the sensing responder 920 may be configured to implement corresponding functions implemented by the sensing responder in the above method, which will not be repeated here for the sake of brevity.

It should be understood that the processor may be an integrated circuit chip having signal processing capability. In implementation, the operations of the above method embodiments may be accomplished by integrated logic circuitry of hardware in processor or instructions in the form of software. The processor may be a general purpose processor, a digital signal processor (DSP), an application specific integrated circuit (ASIC), a field programmable gate array (FPGA) or other programmable logic devices, discrete gates or transistor logic devices, or discrete hardware components. The processor may implement or execute the methods, operations and logic diagrams disclosed in the embodiments of the present disclosure. The general purpose processor may be a microprocessor or any conventional processor. The operations of the method disclosed in the embodiments of the present disclosure may be directly embodied as being executed by a hardware decoding processor or being executed by the hardware and software modules in a decoding processor. The software modules may be located in a storage medium mature in the art, such as a random access memory, a flash memory, a read-only memory, a programmable read-only memory or an electrically erasable programmable memory, a register, etc. The storage medium is located in the memory, and the processor reads the information in the memory to complete the operations of the aforementioned method in conjunction with its hardware.

It will be appreciated that the memory in the embodiments of the present disclosure may be a volatile memory or a non-volatile memory, or may also include both a volatile memory and a non-volatile memory. The non-volatile memory may be a read-only memory (ROM), a programmable ROM (PROM), an erasable PROM (EPROM), an electrically EPROM (EPROM) or a flash memory. The volatile memory may be a random access memory (RAM), which serves as an external cache. By way of illustration but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), a direct rambus RAM (DR RAM). It should be noted that the memory in the systems and methods described herein is intended to include, but is not limited to, these memories and any other suitable types of memory.

It should be understood that the memory described above is exemplary but not limiting. For example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), a direct rambus RAM (DR RAM), etc. That is, the memory in the embodiments of the present disclosure is intended to include, but is not limited to, these memories and any other suitable types of memory.

In an embodiment of the present disclosure, there is further provided a computer-readable storage medium, configured to store a computer program.

Optionally, the computer-readable storage medium may be applied to the sensing initiator of the embodiments of the present disclosure, and the computer program causes a computer to implement corresponding processes implemented by the sensing initiator in the methods of the embodiments of the present disclosure, which will not be repeated here for the sake of brevity.

Optionally, the computer-readable storage medium may be applied to the sensing responder of the embodiments of the present disclosure, and the computer program causes a computer to implement corresponding processes implemented by the sensing responder in the methods of the embodiments of the present disclosure, which will not be repeated here for the sake of brevity.

In an embodiment of the present disclosure, there is further provided a computer program product, which includes computer program instructions.

Optionally, the computer program product may be applied to the sensing initiator of the embodiments of the present disclosure, and the computer program instructions cause a computer to implement corresponding processes implemented by the sensing initiator in the methods of the embodiments of the present disclosure, which will not be repeated here for the sake of brevity.

Optionally, the computer program product may be applied to the sensing responder of the embodiments of the present disclosure, and the computer program instructions cause a computer to implement corresponding processes implemented by the sensing responder in the methods of the embodiments of the present disclosure, which will not be repeated here for the sake of brevity.

In an embodiment of the present disclosure, there is further provided a computer program.

Optionally, the computer program may be applied to the sensing initiator of the embodiments of the present disclosure, the computer program, when running on a computer, causes the computer to implement corresponding processes implemented by the sensing initiator in the methods of the embodiments of the present disclosure, which will not be repeated here for the sake of brevity.

Optionally, the computer program may be applied to the sensing responder of the embodiments of the present disclosure, the computer program, when running on a computer, causes the computer to implement corresponding processes implemented by the sensing responder in the methods of the embodiments of the present disclosure, which will not be repeated here for the sake of brevity.

Those of ordinary skill in the art may realize that the various example units and algorithm steps described in connection with the embodiments disclosed herein may be implemented in electronic hardware or a combination of computer software and electronic hardware. Whether these functions are performed in hardware or software depends on the specific application and design constraints of the technical solution. Professionals may use different methods for each particular application to implement the described functionality, but such implementation should not be considered beyond the scope of the present disclosure.

Those skilled in the art will clearly appreciate that, for convenience and conciseness of description, the specific operating processes of the above-described systems, apparatuses and units may refer to the corresponding processes in the aforementioned method embodiments and will not be repeated herein.

In several embodiments provided herein, it should be understood that the disclosed systems, apparatuses and methods may be implemented in other manners. For example, the above-described embodiments of the apparatus is only schematic, for example, the division of the units is only a logical function division, and in practice, there may be another division manner, for example, multiple units or components may be combined or integrated into another system, or some features may be ignored or not performed. On the other hand, the coupling or direct coupling or communication connection between each other illustrated or discussed may be indirect coupling or communication connection through some interfaces, devices or units, and may be electrical, mechanical or other form.

The units illustrated as separate elements may or may not be physically separated, and the elements displayed as units may or may not be physical units, i.e. may be located in a place, or may be distributed over a plurality of network units. Part or all of the units may be selected according to the actual needs to achieve the purpose of the embodiments of the present disclosure.

In addition, each functional unit in each embodiment of the present disclosure may be integrated in one processing unit, each unit may exist physically alone, or two or more units may be integrated in one unit.

When the functions are realized in the form of software functional units and sold or used as an independent product, they may be stored in a computer readable storage medium. Based on such an understanding, the technical solutions according to the disclosure, in essence or the part contributing to the prior art, or part of the technical solutions can be embodied in the form of a software product. The computer software product is stored in a storage medium, and includes several instructions so that a computer device (which may be a personal computer, a server, a network device or the like) implements all or part of the method according to respective embodiments of the disclosure. The aforementioned storage medium includes various media capable of storing a program code such as a USB disk, a mobile hard drive disk, a read-only memory (ROM), a random access memory (RAM), a magnetic disk or an optical disk.

The above is only the specific implementation of the present disclosure, but the scope of protection of the present disclosure is not limited thereto. Any person skilled in the art may easily think of changes or substitutions within the technical scope disclosed in the present disclosure, which should be covered within the protection scope of the present disclosure. Therefore, the scope of protection of the present disclosure shall be subject to the scope of protection of the claims.

The invention claimed is:

1. A method for wireless communication, comprising:

performing, by a sensing initiator, a setup process of a target sensing session, wherein the target sensing session is of a pairwise negotiation type, performing, by the sensing initiator, the setup process of the target sensing session comprises:

calling, by a station management entity (SME) of the sensing initiator, a first MLME-SAP interface primitive, so that a media access control sublayer management entity (MLME) of the sensing initiator performs the setup process of the target sensing session; and transmitting, by the MLME of the sensing initiator, a first request frame to a sensing responder, wherein the first request frame is configured to request a measurement setup for the target sensing session, wherein the first MLME-SAP interface primitive is configured to indicate:

a measurement setup identification, a duration of a measurement, a number of repetitions of the measurement, an interval time of the measurement, and a sensing request parameter, wherein the sensing request parameter comprises an identity identification of the sensing responder.

2. The method of claim 1, wherein the first request frame comprises the measurement setup identification and/or a session identification.

3. The method of claim 2, wherein the target sensing session corresponds to one measurement setup, and the first request frame comprises a measurement setup identification corresponding to the one measurement setup or a session identification corresponding to the target sensing session.

4. The method of claim 2, wherein the target sensing session corresponds to a plurality of measurement setups, there is one sensing session between the sensing initiator and the sensing responder, and the first request frame comprises a measurement setup identification corresponding to a to-be-set up measurement setup.

5. The method of claim 1, further comprising:

receiving, by the sensing initiator, a first response frame from the sensing responder, the first response frame being configured to indicate response information for the measurement setup.

6. The method of claim 5, wherein the target sensing session corresponds to one measurement setup, and the first response frame comprises a measurement setup identification corresponding to the one measurement setup or a session identification corresponding to the target sensing session.

7. The method of claim 5, wherein the target sensing session corresponds to a plurality of measurement setups, there is one sensing session between the sensing initiator and the sensing responder, and the first response frame comprises a measurement setup identification corresponding to a to-be-set up measurement setup.

8. The method of claim 5, wherein the first response frame comprises the measurement setup identification and/or a session identification.

9. A sensing initiator, comprising: a processor and a memory for storing a computer program, wherein the processor is configured to call and execute the computer program stored in the memory to cause the sensing initiator to:

perform a setup process of a target sensing session, wherein the target sensing session is of a pairwise negotiation type, the processor is configured to cause the sensing initiator to:

call, by a station management entity (SME) of the sensing initiator, a first MLME-SAP interface primitive, so that a media access control sublayer management entity (MLME) of the sensing initiator performs the setup process of the target sensing session; and transmit, by the MLME of the sensing initiator, a first request frame to a sensing responder, wherein the first request frame is configured to request a measurement setup for the target sensing session, wherein the first MLME-SAP interface primitive is configured to indicate:

a measurement setup identification, a duration of a measurement, a number of repetitions of the measurement, an interval time of the measurement, and a sensing request parameter, wherein the sensing request parameter comprises an identity identification of the sensing responder.

10. The sensing initiator of claim 9, wherein the first request frame comprises the measurement setup identification and/or a session identification;

wherein the target sensing session corresponds to one measurement setup, and the first request frame comprises a measurement setup identification corresponding to the one measurement setup or a session identification corresponding to the target sensing session; or the target sensing session corresponds to a plurality of measurement setups, there is one sensing session between the sensing initiator and the sensing responder, and the first request frame comprises a measurement setup identification corresponding to a to-be-set up measurement setup.

11. The sensing initiator of claim 9, wherein the processor is further configured to:

receive a first response frame from the sensing responder, the first response frame being configured to indicate response information for the measurement setup.

12. The sensing initiator of claim 9, wherein the first response frame comprises the measurement setup identification and/or a session identification.

13. The sensing initiator of claim 9, wherein the target sensing session corresponds to one measurement setup, and the first response frame comprises a measurement setup identification corresponding to the one measurement setup or a session identification corresponding to the target sensing session.

14. The sensing initiator of claim 9, wherein the target sensing session corresponds to a plurality of measurement setups, there is one sensing session between the sensing initiator and the sensing responder, and the first response frame comprises a measurement setup identification corresponding to a to-be-set up measurement setup.

15. A sensing responder, comprising: a processor and a memory for storing a computer program, wherein the processor is configured to call and execute the computer program stored in the memory to cause the sensing responder to:

receive a first request frame from a sensing initiator, the first request frame being configured to request a measurement setup, wherein the measurement setup corresponds to a target sensing session with a pairwise negotiation type, and before receiving the first request frame, a first MLME-SAP interface primitive is called by a station management entity (SME) of the sensing initiator, so that a media access control sublayer management entity (MLME) of the sensing initiator performs the setup process of the target sensing session, wherein the first MLME-SAP interface primitive is configured to indicate: a measurement setup identification, a duration of a measurement, a number of repetitions of the measurement, an interval time of the measurement, and a sensing request parameter, wherein the sensing request parameter comprises an identity identification of the sensing responder.

16. The sensing responder of claim 15, wherein the first request frame comprises the measurement setup identification and/or a session identification;

wherein the target sensing session corresponds to one measurement setup, and the first request frame comprises a measurement setup identification corresponding to the one measurement setup or a session identification corresponding to the target sensing session; or the target sensing session corresponds to a plurality of measurement setups, there is one sensing session between the sensing initiator and the sensing responder, and the first request frame comprises a measurement setup identification corresponding to a to-be-set up measurement setup.

17. The sensing responder of claim 15, wherein the processor is further configured to:

transmit a first response frame to the sensing initiator, the first response frame being configured to indicate response information for the measurement setup.

18. The sensing responder of claim 17, wherein the first response frame comprises the measurement setup identification and/or a session identification.

19. The sensing responder of claim 17, wherein the target sensing session corresponds to one measurement setup, and the first response frame comprises a measurement setup identification corresponding to the one measurement setup or a session identification corresponding to the target sensing session.

20. The sensing responder of claim 17, wherein the target sensing session corresponds to a plurality of measurement setups, there is one sensing session between the sensing initiator and the sensing responder, and the first response frame comprises a measurement setup identification corresponding to a to-be-set up measurement setup.

* * * * *